(12) United States Patent
Lawson et al.

(10) Patent No.: US 11,263,381 B1
(45) Date of Patent: Mar. 1, 2022

(54) SYSTEM AND METHOD FOR UPDATING SHAPES ASSOCIATED WITH AN ELECTRONIC DESIGN

(71) Applicant: Cadence Design Systems, Inc., San Jose, CA (US)

(72) Inventors: Randall Scott Lawson, Durham, NH (US); Regis R. Colwell, Gibsonia, PA (US); Richard Allen Woodward, Jr., San Diego, CA (US); Rahil Rajesh Kothari, Waltham, MA (US); Mahmoodreza Jahanseirroodsari, Worcester, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/193,357

(22) Filed: Mar. 5, 2021

(51) Int. Cl.
*G06F 30/398* (2020.01)
*G06F 30/12* (2020.01)
*G06F 113/18* (2020.01)

(52) U.S. Cl.
CPC ............ *G06F 30/398* (2020.01); *G06F 30/12* (2020.01); *G06F 2113/18* (2020.01)

(58) Field of Classification Search
CPC ...................................................... G06F 30/398
USPC ........................................................ 716/119
See application file for complete search history.

(56) References Cited

U.S. PATENT DOCUMENTS 7,159,197 B2 * 1/2007 Falbo .................... G06F 30/398
716/52

\* cited by examiner

*Primary Examiner* — Eric D Lee
(74) *Attorney, Agent, or Firm* — Mark H. Whittenberger, Esq.; Holland & Knight LLP

(57) ABSTRACT

Embodiments include herein are directed towards a method for use in an electronic design environment is provided. Embodiments may include receiving, using a processor, an electronic design and providing, at a graphical user interface, an option to change an object associated with the electronic design. Embodiments may further include identifying a damage area associated with the electronic design, the damage area including an object therein. Embodiments may also include generating a polygon for the damage area and caching one or more voids located outside of the damage area. Embodiments may further include performing a cut and stamp operation on a portion of the electronic design associated with the damage area and populating, at the graphical user interface, a repaired damage area.

20 Claims, 28 Drawing Sheets

Delete the via

FIG. 13C — Truncate to Damage Area
FIG. 13B — Smoothed Stamp Area
FIG. 13A — Stamp

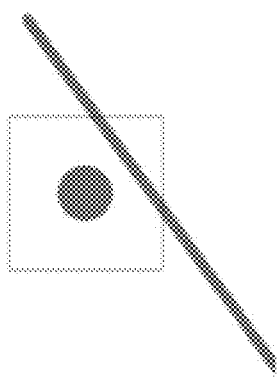
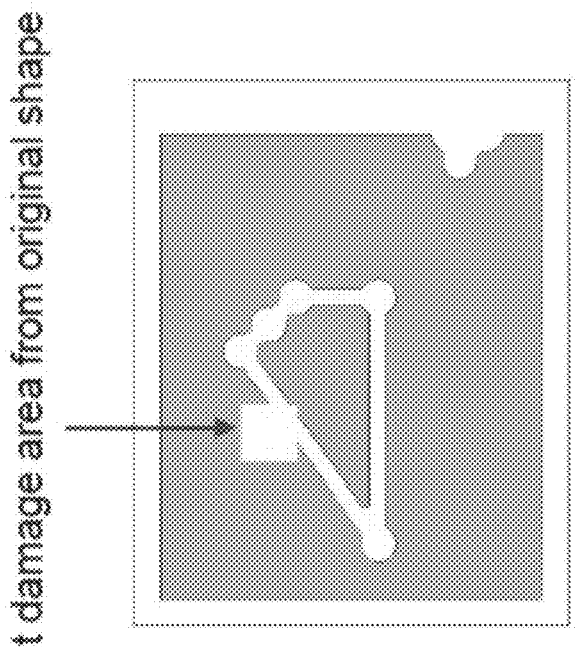
FIG. 22

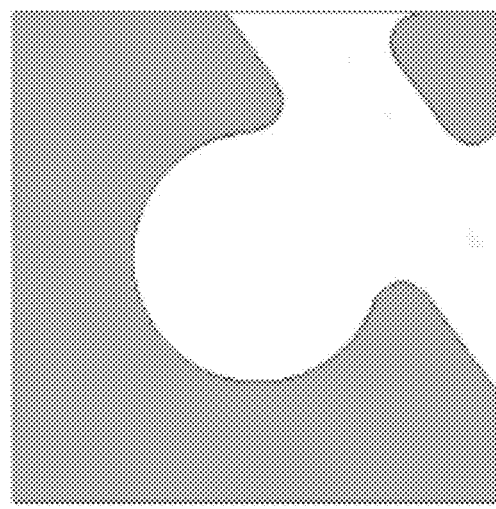
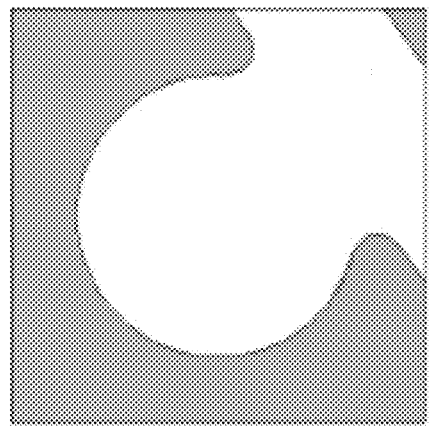
FIG. 23

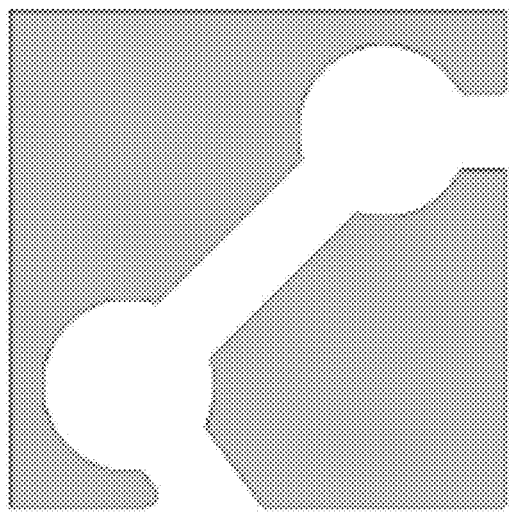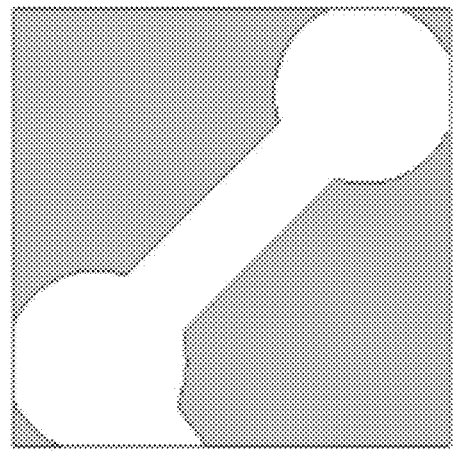
FIG. 27

SYSTEM AND METHOD FOR UPDATING SHAPES ASSOCIATED WITH AN ELECTRONIC DESIGN

FIELD OF THE INVENTION

The present disclosure relates to electronic design automation (EDA), and more specifically, to a method for updating shapes in an electronic design.

DISCUSSION OF THE RELATED ART

EDA utilizes software tools that may be used in the design and analysis of numerous electronic systems such as printed circuit boards (PCBs) and integrated circuits (ICs). Some of these tools offer static and dynamic types of shapes. Generally, static shapes are not managed by the system based on user design edits while dynamic shapes may automatically update voids as the designer proceeds. Static shapes can be very valuable in Engineering Change Order (ECO) flows where the designer does not want the system to make any changes to the shape he or she doesn't see or sign off on. Dynamic shapes, which update as design changes are made, allow the designer to easily see the impact of their edits and immediately undo and try another strategy if the impact on the shape is unacceptable. Dynamic shapes can be disabled—meaning no voiding is done (useful for a short term if you are making a large number of changes), rough—meaning voiding is done but artwork checks and smoothing is not (occasionally, the user sees higher performance with localized updates based on design changes at the expense of having to do an update to final artwork later), and smooth, where all artwork prep is done in real-time as the design changes are made (great for smaller designs or later in the design, once you need 100% accurate shape outlines for SI analysis and other operations).

While many aspects of the two shape types are the same—the constraints they follow, for instance—the nature of dynamic shapes gives them advantages over static shapes. If they break into multiple etch pieces, islands and antenna areas can be automatically suppressed. Thermal connections can be updated in real-time. They can even have their fill style and parameters individually modified with instance-level customizations over the default global shape fill settings.

For example, if a designer has just routed a signal net through their ground shape, they may want to determine the impact this may have on the shape. First, required spacing will be determined. The basic holes for the cline, vias, and pins can then be cut from the shape. If the cline crosses multiple constraint regions, the spacing may be different in each of these. With vias and pins, multiple constraints may play a role—drill hole to shape clearance, regular or anti-pad clearance, even route keepout clearances for backdrilled pads. If the designer has set oversize clearances at the object, shape, or global shape parameters level, these are added for the basic hole generation.

Once the basic holes are generated, they may be merged together to form compound void outlines. If the designer has routed a single net through the shape, the clines and vias are all connected together: the designer will see only one resulting hole. The hole and surrounding metal shape must then be analyzed for manufacturability. Acute angles will be trimmed. Narrow areas of the shape will be removed. And portions of the shape with no connections (known as islands) may be suppressed entirely.

Finally, the impact of these new voids is validated against surrounding elements. If the void around the cline causes a nearby ground via to disconnect from the shape, it may now need to be voided and thermally connected, instead. If the shape uses a cross-hatched fill, partial voids in the pattern may need to be filled to eliminate acid traps. Once the shape's outline is deemed constraint-abiding and artwork ready, it is ready for the designer to visualize on the screen. Constraints also have a significant impact on voiding, which makes the issue even more complex.

SUMMARY

In one or more embodiments of the present disclosure, a computer-implemented method for use in an electronic design environment is provided. The method may include receiving, using a processor, an electronic design and providing, at a graphical user interface, an option to change an object associated with the electronic design. The method may further include identifying a damage area associated with the electronic design, the damage area including an object therein. The method may also include generating a polygon for the damage area and caching one or more voids located outside of the damage area. The method may further include performing a cut and stamp operation on a portion of the electronic design associated with the damage area and populating, at the graphical user interface, a repaired damage area.

One or more of the following features may be included. The method may include identifying a smoothing area and generating a polygon for the smoothing area. The method may also include performing smoothing on the object and any objects touching the smoothing area. The method may further include increasing a size of the damage area if a plurality of objects are changed and identifying at least one object on each of a plurality of layers. The method may also include generating, caching, performing, and populating for a plurality of objects. In some embodiments, the damage area may be based upon, at least in part, a design rule clearance from the object and a factor of minimum manufacturing aperture. The smoothing area may be based upon, at least in part, the damage area and the factor of minimum manufacturing aperture.

In one or more embodiments of the present disclosure a computer-readable storage medium having stored thereon instructions, which when executed by a processor result in one or more operations is provided. Operations may include receiving, using a processor, an electronic design and providing, at a graphical user interface, an option to change an object associated with the electronic design. Operations may further include identifying a damage area associated with the electronic design, the damage area including an object therein. Operations may also include generating a polygon for the damage area and caching one or more voids located outside of the damage area. Operations may further include performing a cut and stamp operation on a portion of the electronic design associated with the damage area and populating, at the graphical user interface, a repaired damage area.

One or more of the following features may be included. Operations may include identifying a smoothing area and generating a polygon for the smoothing area. Operations may also include performing smoothing on the object and any objects touching the smoothing area. Operations may further include increasing a size of the damage area if a plurality of objects are changed and identifying at least one object on each of a plurality of layers. Operations may also include generating, caching, performing, and populating for a plurality of objects. In some embodiments, the damage area may be based upon, at least in part, a design rule clearance from the object and a factor of minimum manufacturing aperture. The smoothing area may be based upon, at least in part, the damage area and the factor of minimum manufacturing aperture.

In one or more embodiments of the present disclosure, a system for use in an electronic design environment is provided. The system may include at least one processor configured to receive an electronic design and provide, at a graphical user interface, an option to change an object associated with the electronic design. The at least one processor may be further configured to identify a damage area associated with the electronic design, the damage area including an object therein. The at least one processor may be further configured to generate a polygon for the damage area and cache one or more voids located outside of the damage area. The at least one processor may be further configured to perform a cut and stamp operation on a portion of the electronic design associated with the damage area. The at least one processor may be further configured to populate, at the graphical user interface, a repaired damage area.

One or more of the following features may be included. The at least one processor may be further configured to identify a smoothing area.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIGS. 16-28 show backend graphical user interfaces that may be displayed for debugging in accordance with an embodiment of the present disclosure.

DETAILED DESCRIPTION

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Figure 1:
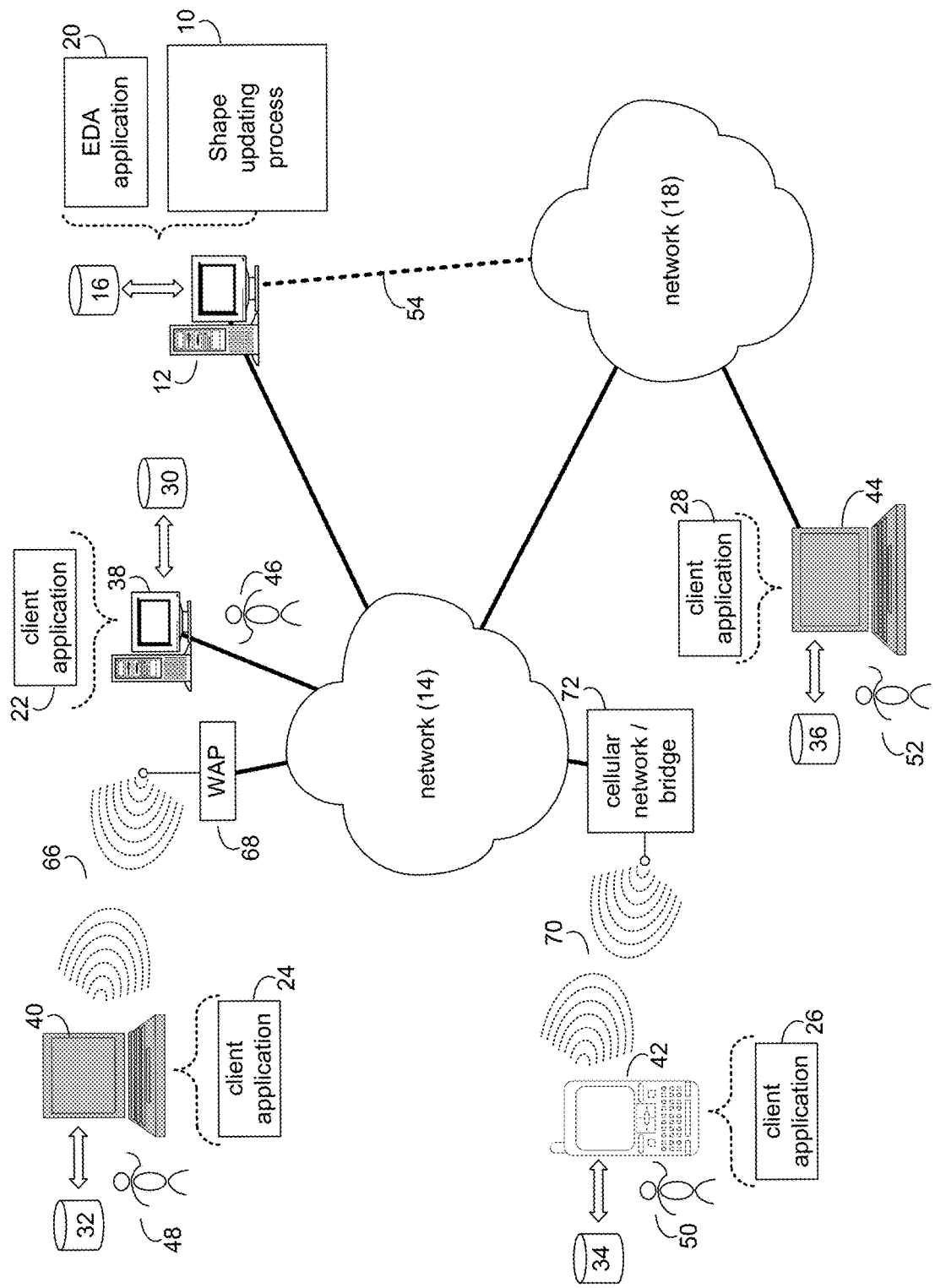
FIG. 1 is a system diagram depicting aspects of the shape updating process in accordance with an embodiment of the present disclosure.

Referring to FIG. 1, there is shown shape updating process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, the shape updating process may reside on and be executed, in whole or in part, by a client electronic device, such as a personal computer, notebook computer, personal digital assistant, or the like.

The instruction sets and subroutines of shape updating process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol)

access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for report generation. EDA application 20 may be referred to herein as a design tool.

Shape updating process 10 may be a stand alone application, or may be an applet/application/script that may interact with and/or be executed within EDA application 20. In addition/as an alternative to being a server-side process, the manufacturing design rule analysis process may be a client-side process (not shown) that may reside on a client electronic device (described below) and may interact with an EDA client application (e.g., one or more of EDA client applications 22, 24, 26, 28). Further, the shape updating process may be a hybrid server-side/client-side process that may interact with EDA application 20 and an EDA client application (e.g., one or more of client applications 22, 24, 26, 28). As such, the shape updating process may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize shape updating process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14. In some embodiments, shape updating process 10 may be a cloud-based process as any or all of the operations described herein may occur, in whole, or in part, in the cloud or as part of a cloud-based system.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
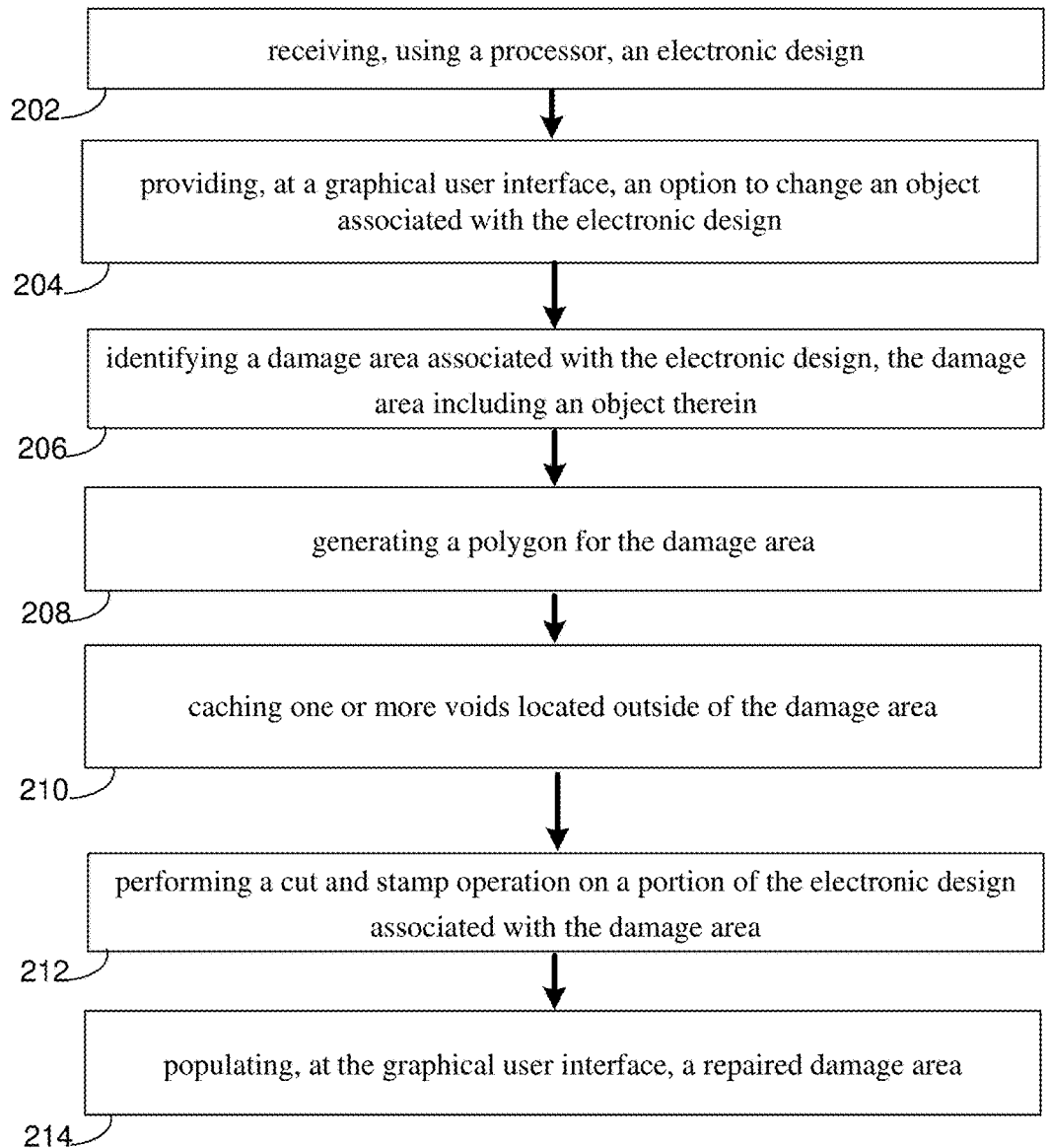
FIG. 2 is a flowchart depicting operations consistent with the shape updating process of the present disclosure.

Referring now to FIG. 2 a flowchart 200 showing operations consistent with embodiments of shape updating process 10 is provided. Some operations may include receiving 202, using a processor, an electronic design and providing 204, at a graphical user interface, an option to change an object associated with the electronic design. The method may further include identifying 206 a damage area associated with the electronic design, the damage area including an object therein. The method may also include generating 208 a polygon for the damage area and caching one or more voids located outside of the damage area. The method may further include performing 210 a cut and stamp operation on a portion of the electronic design associated with the damage area and populating 212, at the graphical user interface, a repaired damage area. Numerous other operations are also within the scope of the present disclosure as is discussed in further detail below.

As used herein, the term "shape" may indicate a copper filled area. The term "void" may correspond to a hole in a shape. The phrases "damage area", "smooth area", and "search area" may include one or more closed polygons that may be seen by backend debugging users, if desired, and not displayed to the front-end designer. The phrase "damage area" may indicate an area that may change and may be constructed using design rule clearance from the object and a factor of the minimum manufacturing aperture. The phrase "smooth area" may indicate an additional area beyond the damage area that may be used to ensure a smooth transition of changes in damage area. This may be constructed from the damage area and factor of the minimum manufacturing aperture. The phrase "search area" may be constructed from the smooth area and a factor of the minimum manufacturing aperture.

Figure 3:
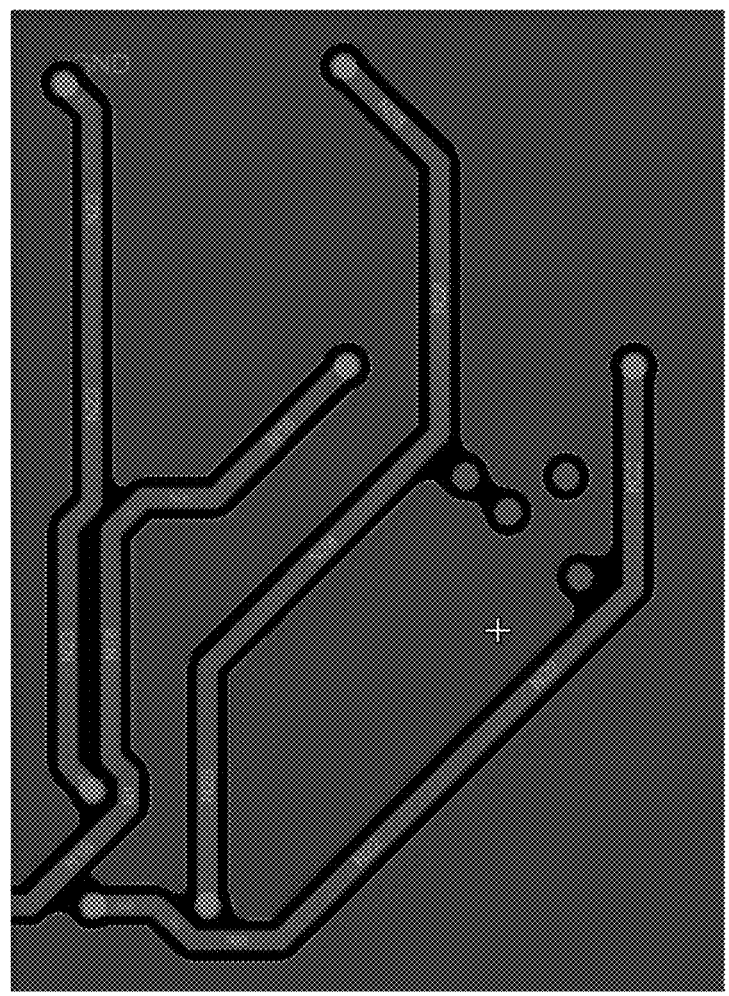
FIGS. 3-5 depict graphical user interfaces depicting aspects of the performance issues encountered by the current shape updating process. These performance issues are resolved in accordance with an embodiment of the present disclosure.

Referring now to FIG. 3, a graphical user interface 300 showing an example of dynamic shape voiding consistent with embodiments of the present disclosure is provided. Dynamic shapes may be conductor shapes and may be voided dynamically when the user makes design edits. The voiding is such that it follows the constraint rules and other shape parameter settings so that there are no shape related design rule checks (DRCs). The resulting voiding provides an indication of the connectivity model which is essential to the designer.

Figure 4:
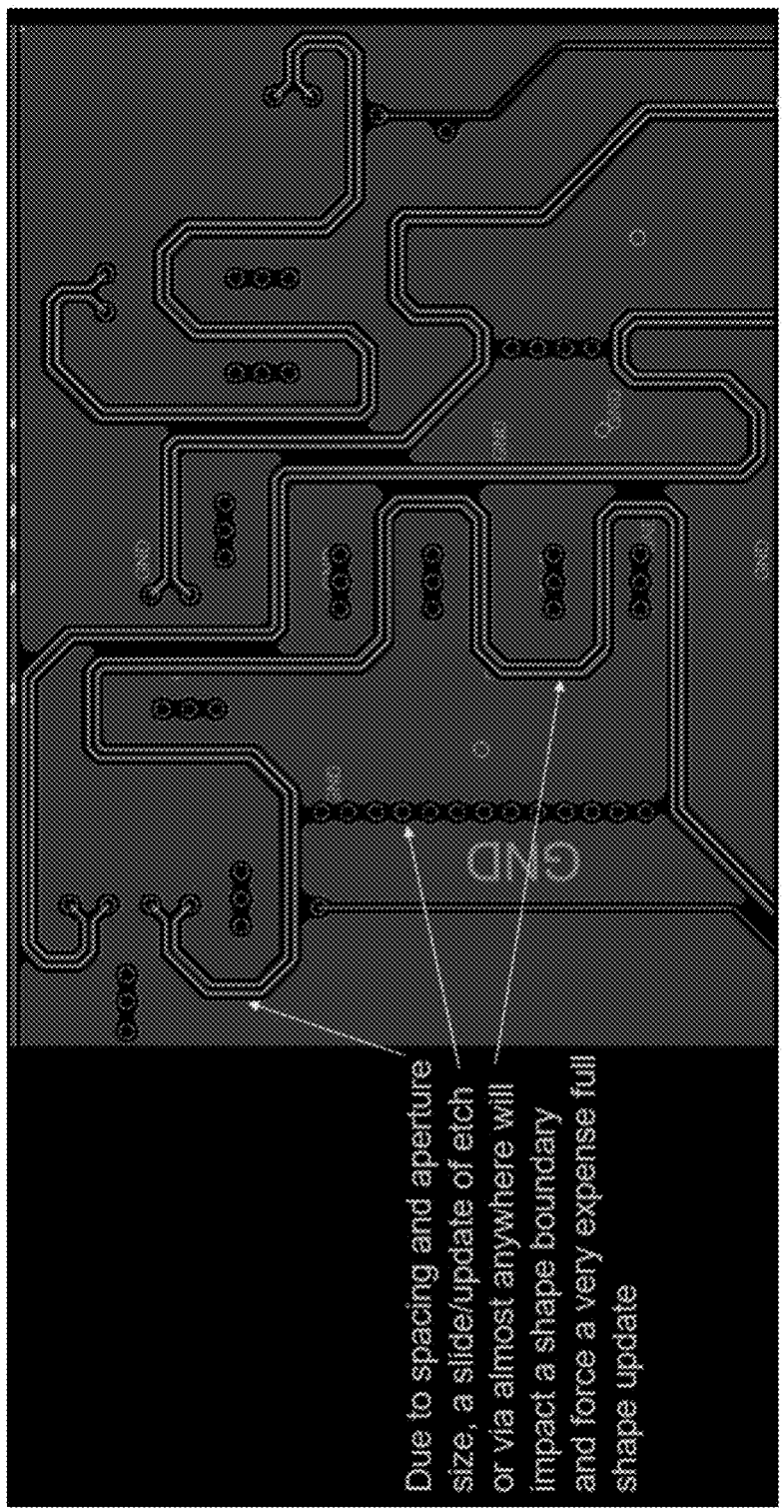
Figure 5:
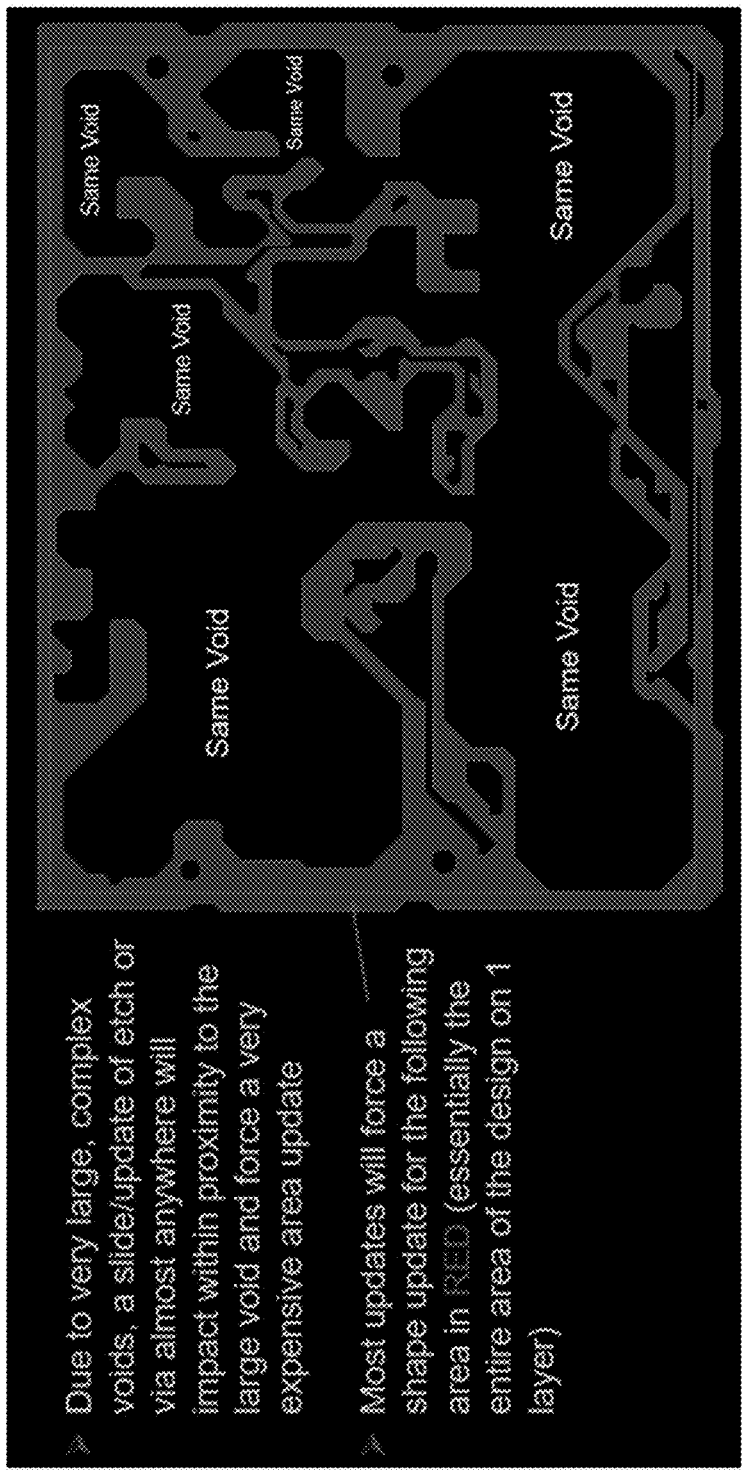

Referring now to FIGS. 4-5, graphical user interfaces 400 and 500 are provided that depict comprehensive shape repair (CSR) approaches of existing systems. In these examples, dynamic shape voiding performance depends on how much work has to be done to update the shape for the requested changes. Comprehensive shape repair often requires large amounts of data to produce an updated shape and is an extremely slow process. This is particularly true for large complex shapes, for example, when a user makes a small edit touching the shape outline or makes an edit impacting a large complex void.

In these existing approaches, the user needs to work around these complex issues by either, disabling their shapes, moving the shapes outside of the design space, breaking their large shapes into smaller shapes and having to settle for very slow performance. This dynamic voiding issue is a common problem in the industry. Disabled shapes is not a good answer. User has no idea how the shapes are going to break into pieces and what the connectivity will look like. Moreover, moving shapes off the electronic design may create as many issues as disabling shapes. Breaking shapes into pieces manually is tedious and introduces other type of issues. Some edits are fast and others edits that look and feel the same to a user are painfully slow. Putting up with the slowness was becoming increasingly painful as more complex designs may run multiple times slower.

Figure 6B:
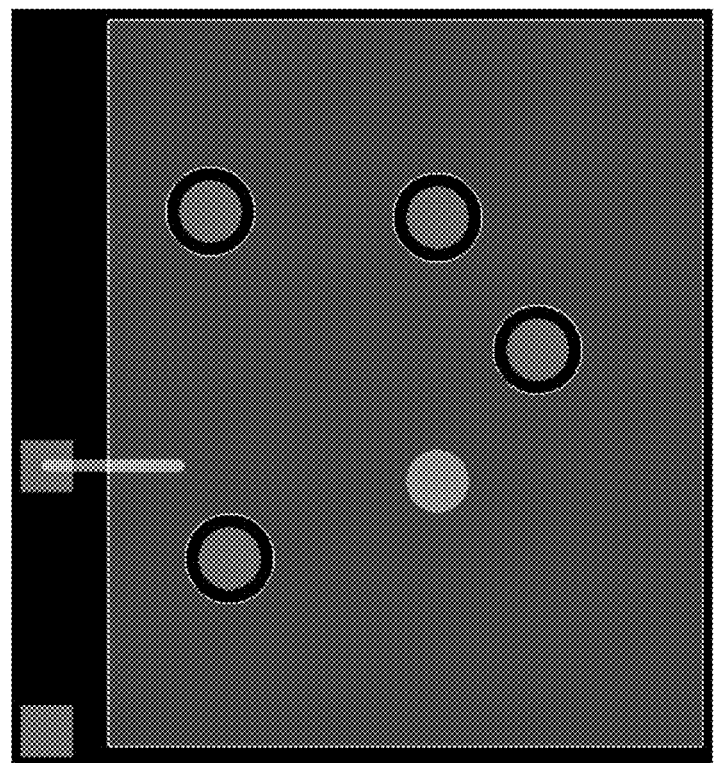
FIG. 6A shows a backend graphical user interface associated with debugging and FIG. 6B shows a graphical user interface that may be displayed to a designer in accordance with an embodiment of the present disclosure.
Figure 6A:
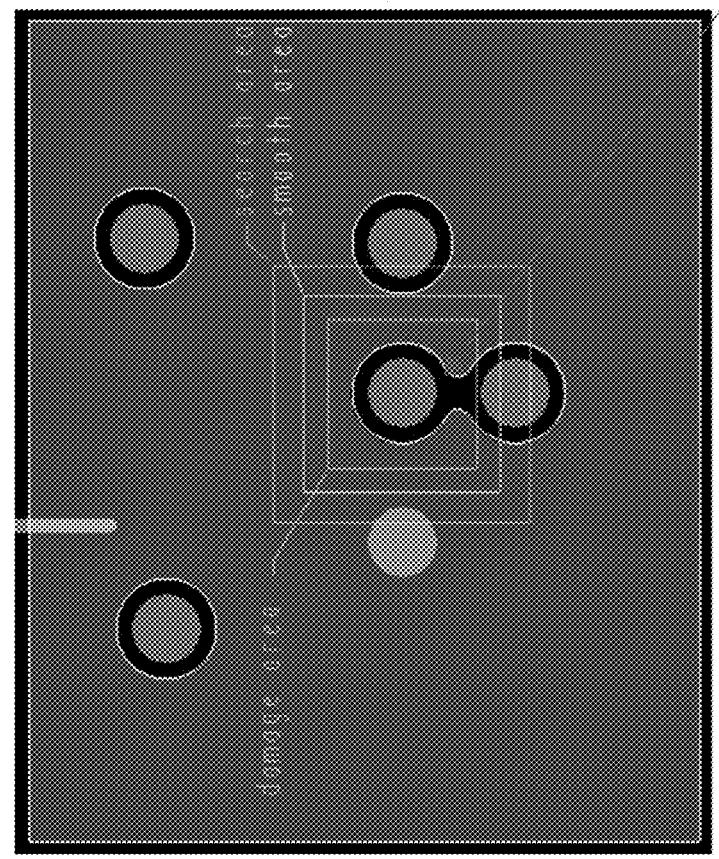
Figure 7:
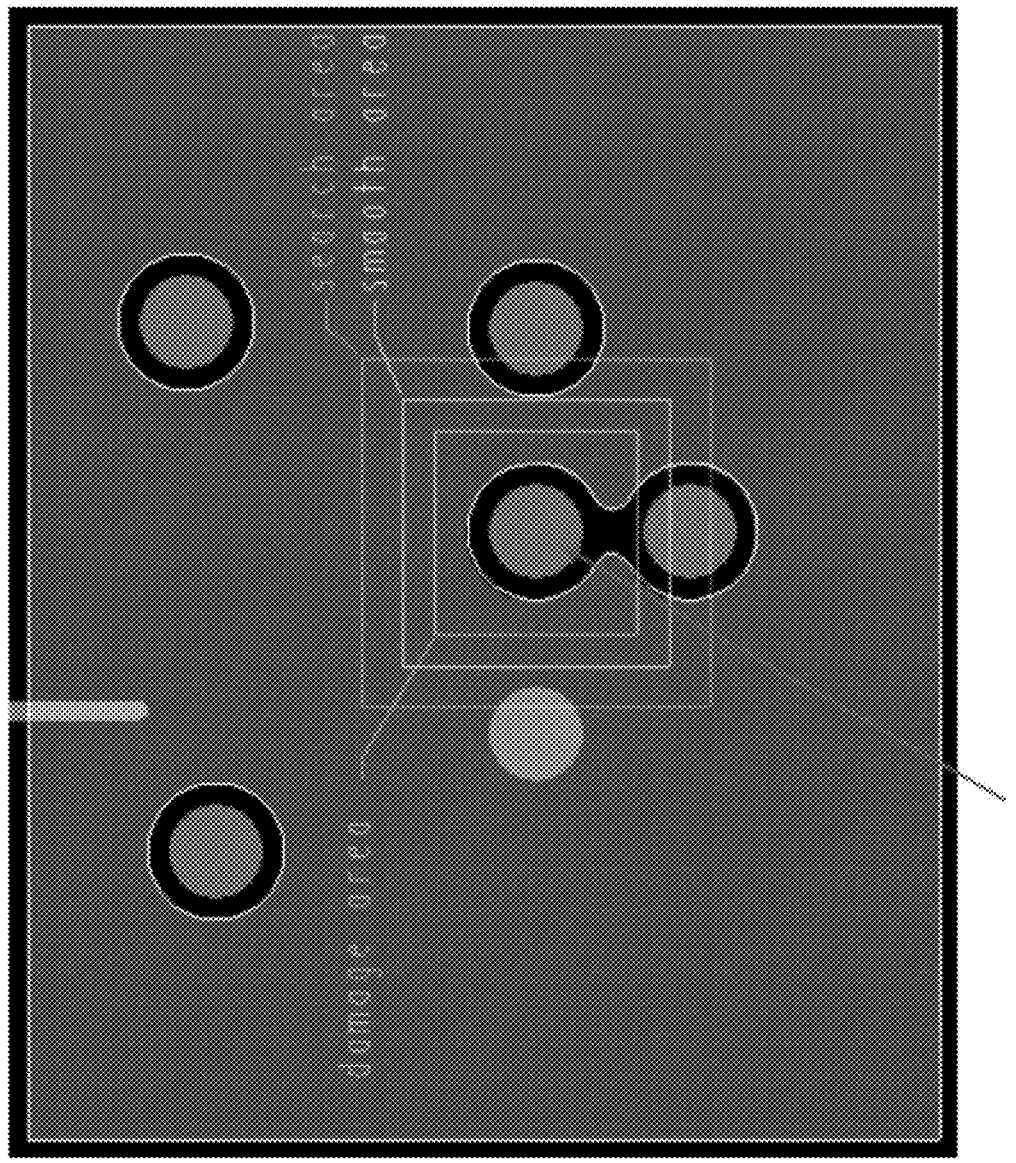
FIGS. 7-10 show backend graphical user interfaces that may be displayed for debugging in accordance with an embodiment of the present disclosure.

Accordingly, and referring also to FIGS. 6-7, embodiments of shape updating process 10 may utilize a backend cut and stamp approach that may produce almost identical results to previous approaches. As discussed below, these operations may occur without the front-end designer or user even visualizing them. However, shape updating process 10 may allow for back-end debugging users to access, visualize, and/or edit various aspects of a design. Shape updating process 10 does not suffer from the randomness of some edits being fast and some edits being slow and is far more predictable (e.g. using some prior approaches processes that would take minutes may be reduced to mere seconds). The performance of shape updating process 10 may scale with complexity and layers.

In some embodiments, shape updating process 10 may leverage the original shape prior to an incremental update. Shape updating process 10 may identify the area of change (damaged area) based on the edits made by the user. Shape updating process 10 may utilize a cut and stamp process to only update the damaged area. In some embodiments, boolean operations may be used to perform a cut and stamp.

In operation, and referring again to FIGS. 6-7, shape updating process 10 may identify a damage area and create a polygon for the damage area. Shape updating process 10 may cache all voids outside of the damage area and perform a cut and stamp operation. The process may then populate voids that were cached and delete the via as shown in FIG. 6-7. It should be noted that the generation of voids may occur only in the stamp area (e.g. damage and smooth areas). Accordingly, a minimal amount of new holes are generated.

Figure 8:
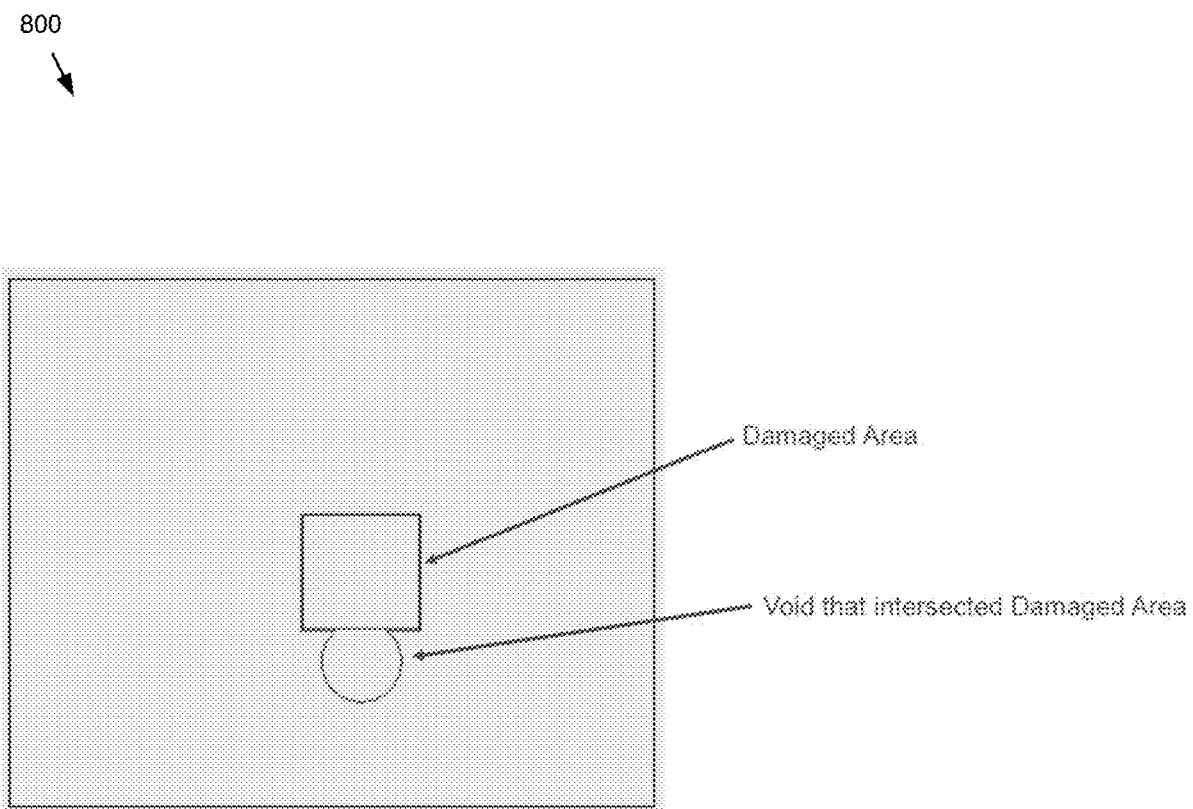
Figure 9:
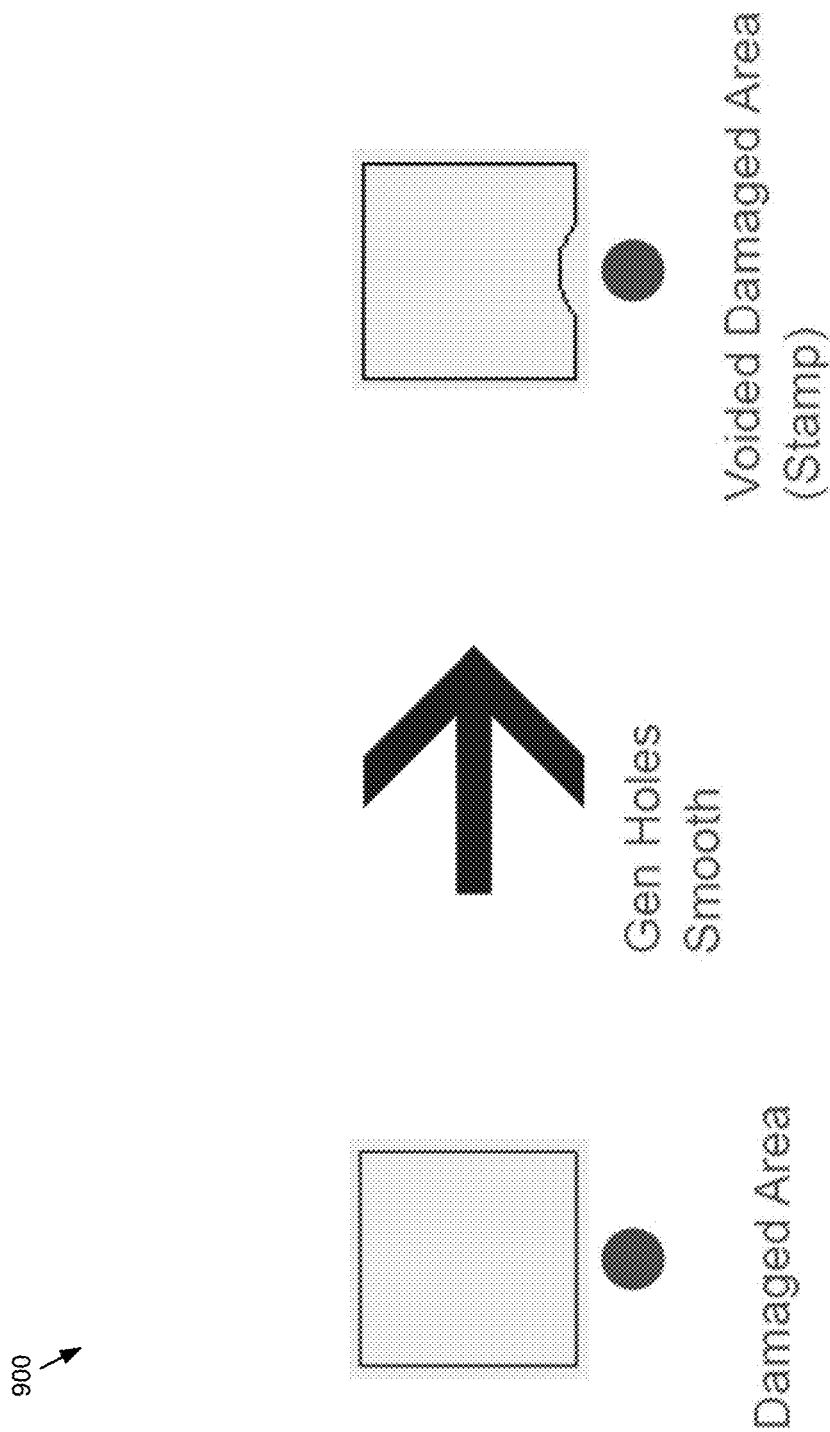
Figure 10:
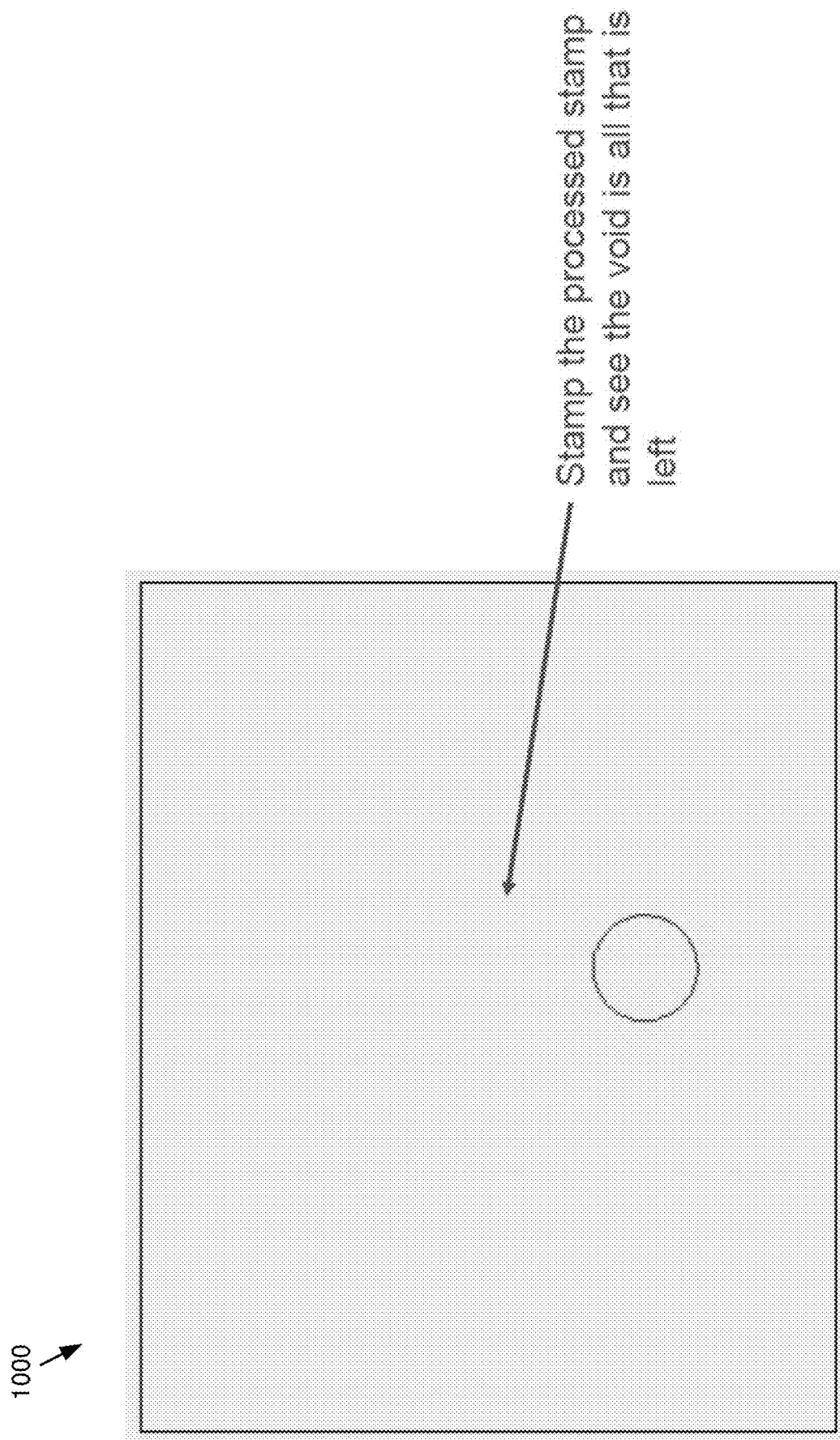

Referring now to FIG. 8, an embodiment of shape updating process 10 showing a cut operation is provided. In this example, the damaged area and void that intersected the damaged are displayed. Shape updating process 10 may shape the polygon with only the voids in area of interest. The remaining voids are cached aside to be reloaded later. Processing of the damaged area is shown in FIG. 9 and the stamp operation is shown in FIG. 10 where the processed stamp is stamped showing only the void remaining.

Figure 11B:
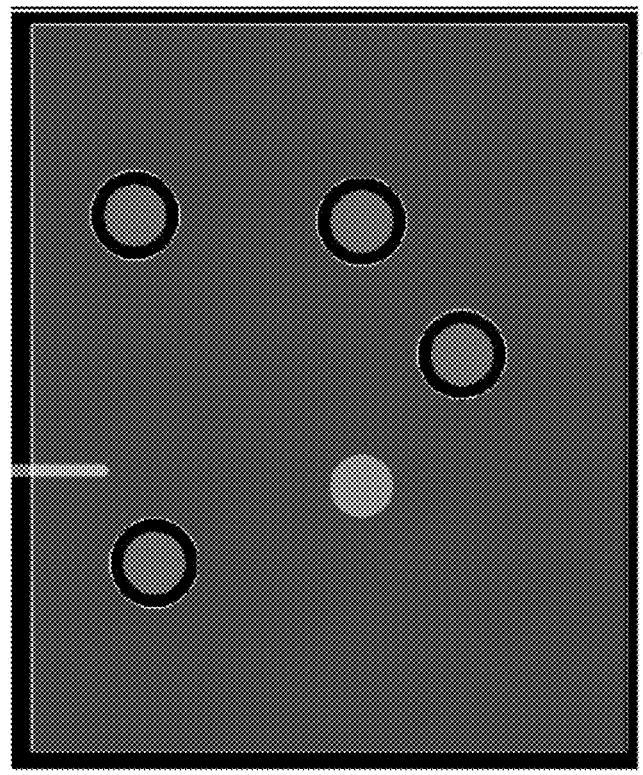
FIG. 11A shows a backend graphical user interface and FIG. 11B shows a graphical user interface that may be displayed to a designer in accordance with an embodiment of the present disclosure.
Figure 11A:
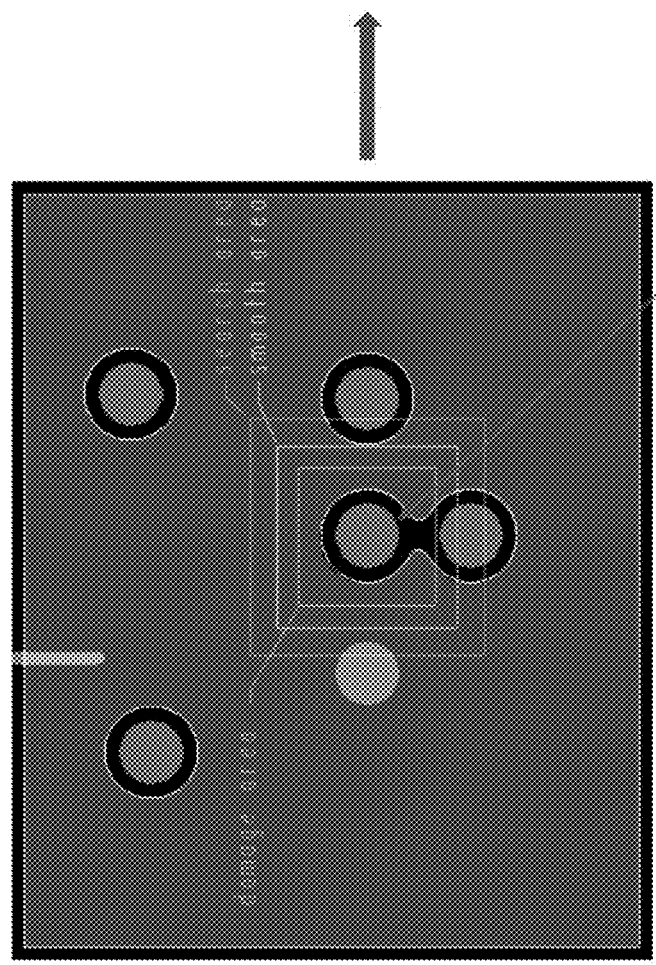

Referring now to FIG. 11 an embodiment showing the search, smoothing, and damage areas (FIG. 11A) and the final result of a cut and stamp operation (FIG. 11B) in accordance with shape updating process 10 is provided. Process 10 may identify the damage area and delete one or more voids in or touching damage area. Process 10 may then cache all other voids and perform the cut and stamp operation. Process 10 may then reload the voids that were cached.

Figure 12:
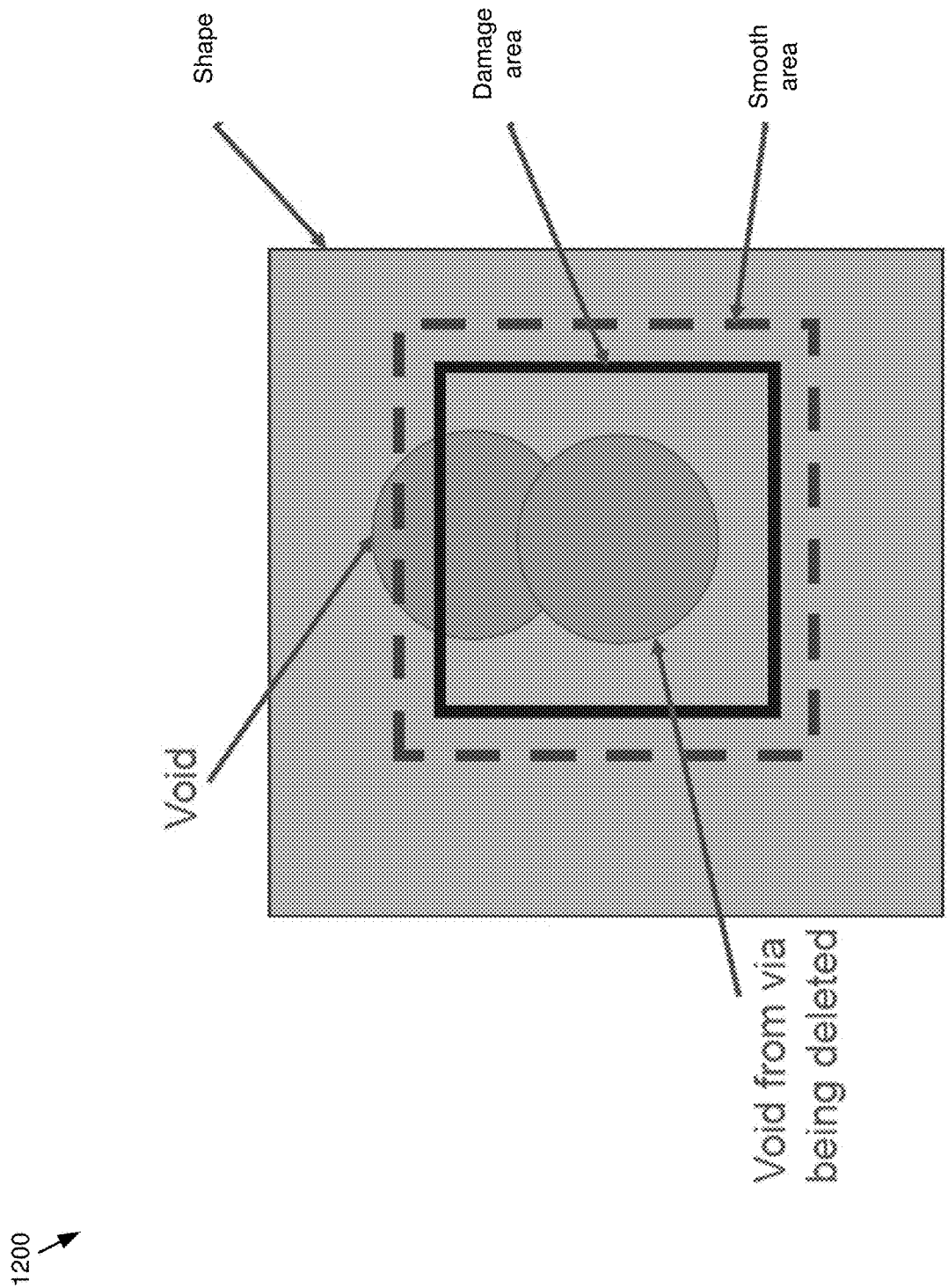
FIGS. 12-13 show backend graphical user interfaces that may be displayed for debugging in accordance with an embodiment of the present disclosure.
Figure 13:
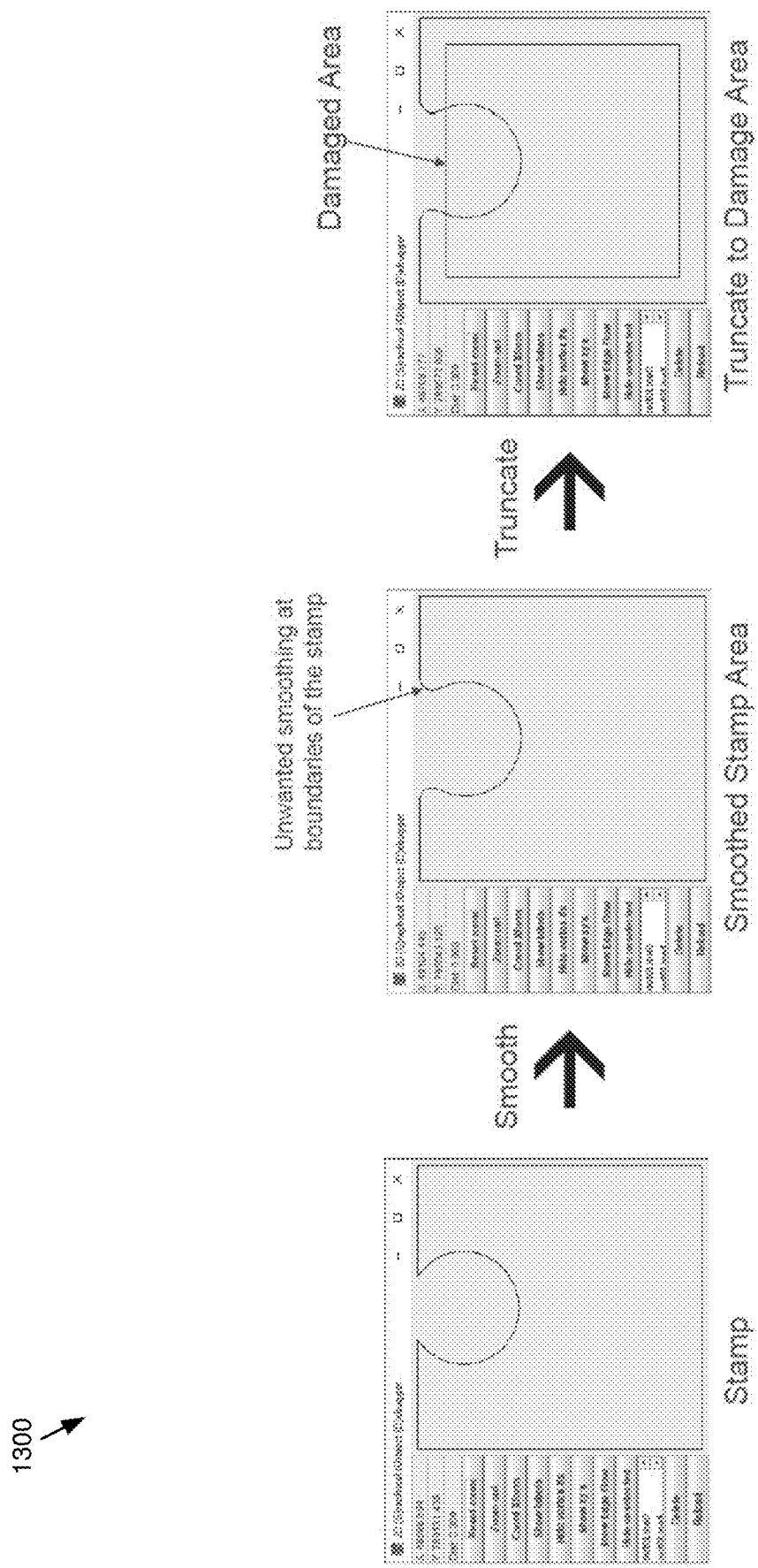

Referring now to FIGS. 12-13, embodiments of shape updating process 10 showing examples of localized smoothing techniques are provided. In this example, the damage area is the box that may be actually replaced with the new incremental mode. The smooth area is the box that may be used for smoothing. Any smoothing artifacts at the edges of this box may be trimmed out. FIG. 13 shows three graphical user interfaces that backend debugging users may utilize. These diagrams show a stamp (FIG. 13A), a smoothed stamp area (FIG. 13B), and a truncate to damage area (FIG. 13C). In some embodiments, shape updating process 10 may smooth only objects in the damage area and those touching the smooth area.

Figure 14:
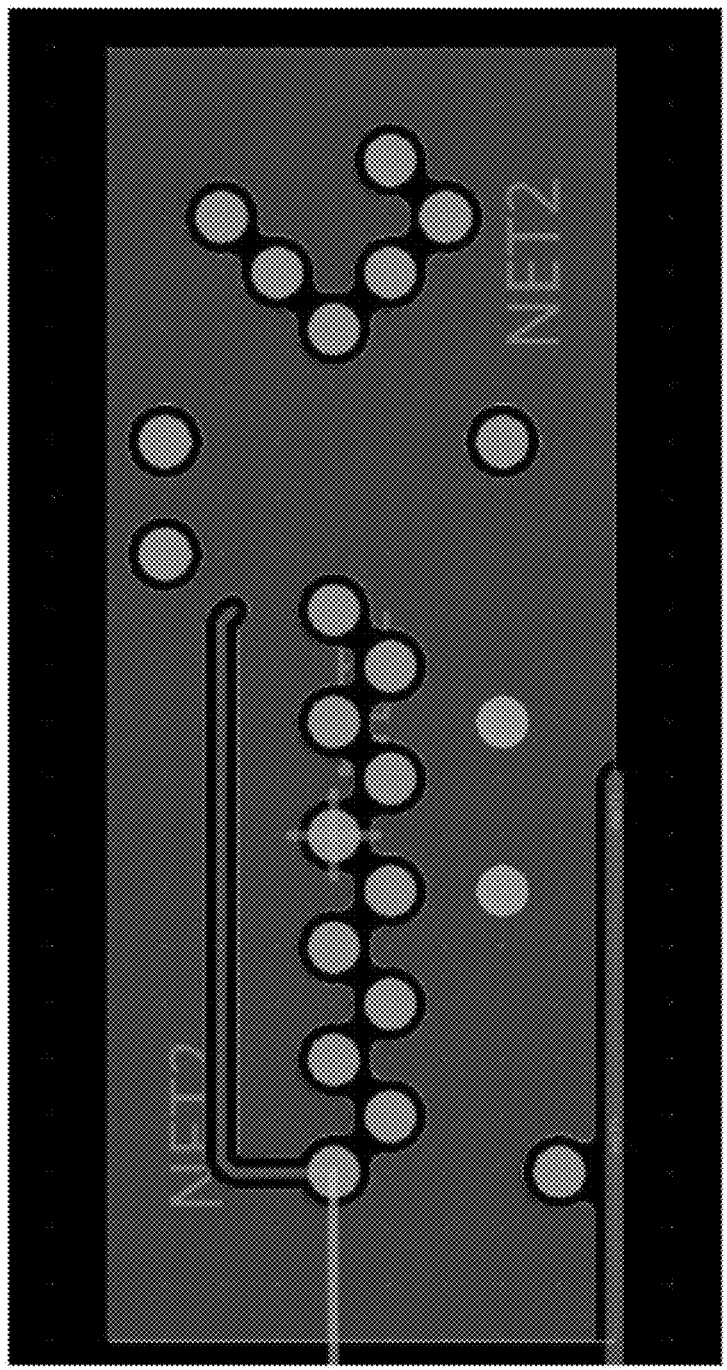
FIGS. 14-15 depict designer facing, front-end graphical user interfaces depicting aspects of the shape updating process in accordance with an embodiment of the present disclosure.
Figure 15:
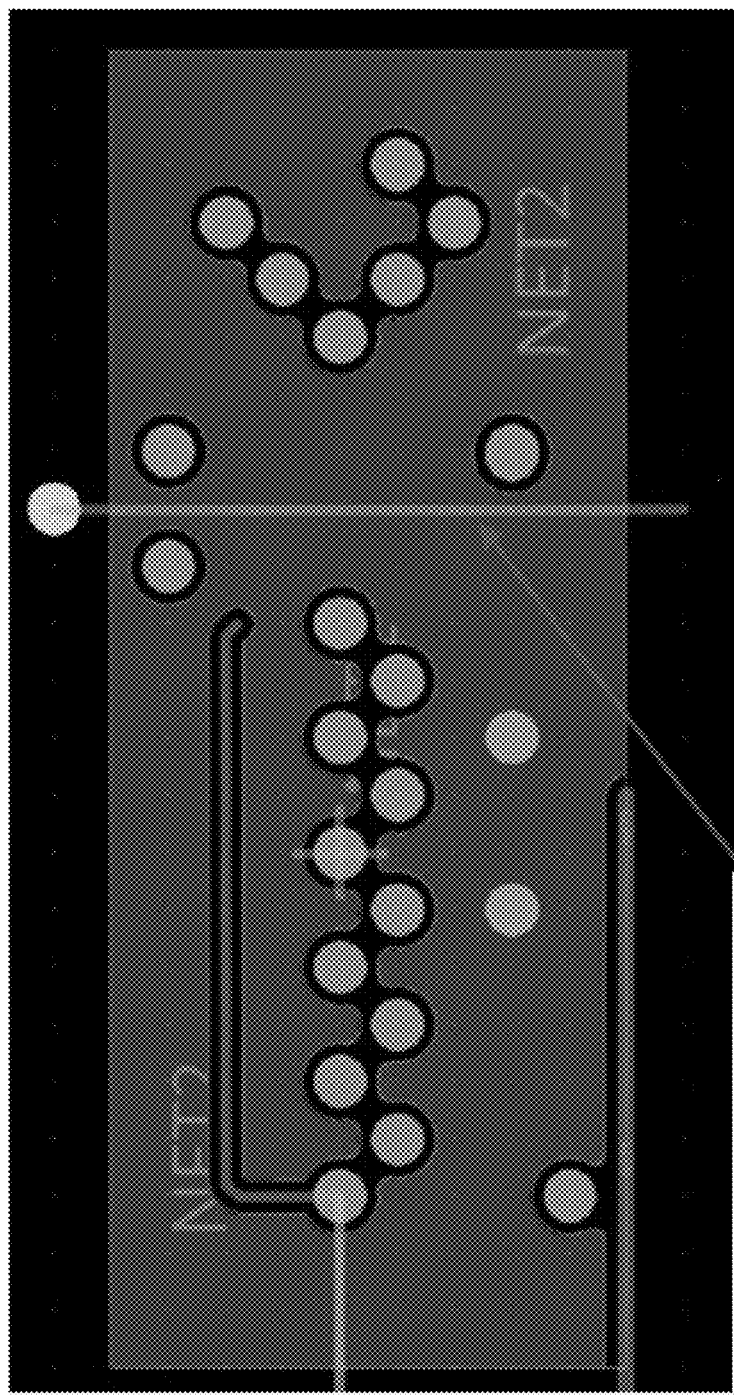
Figure 16:
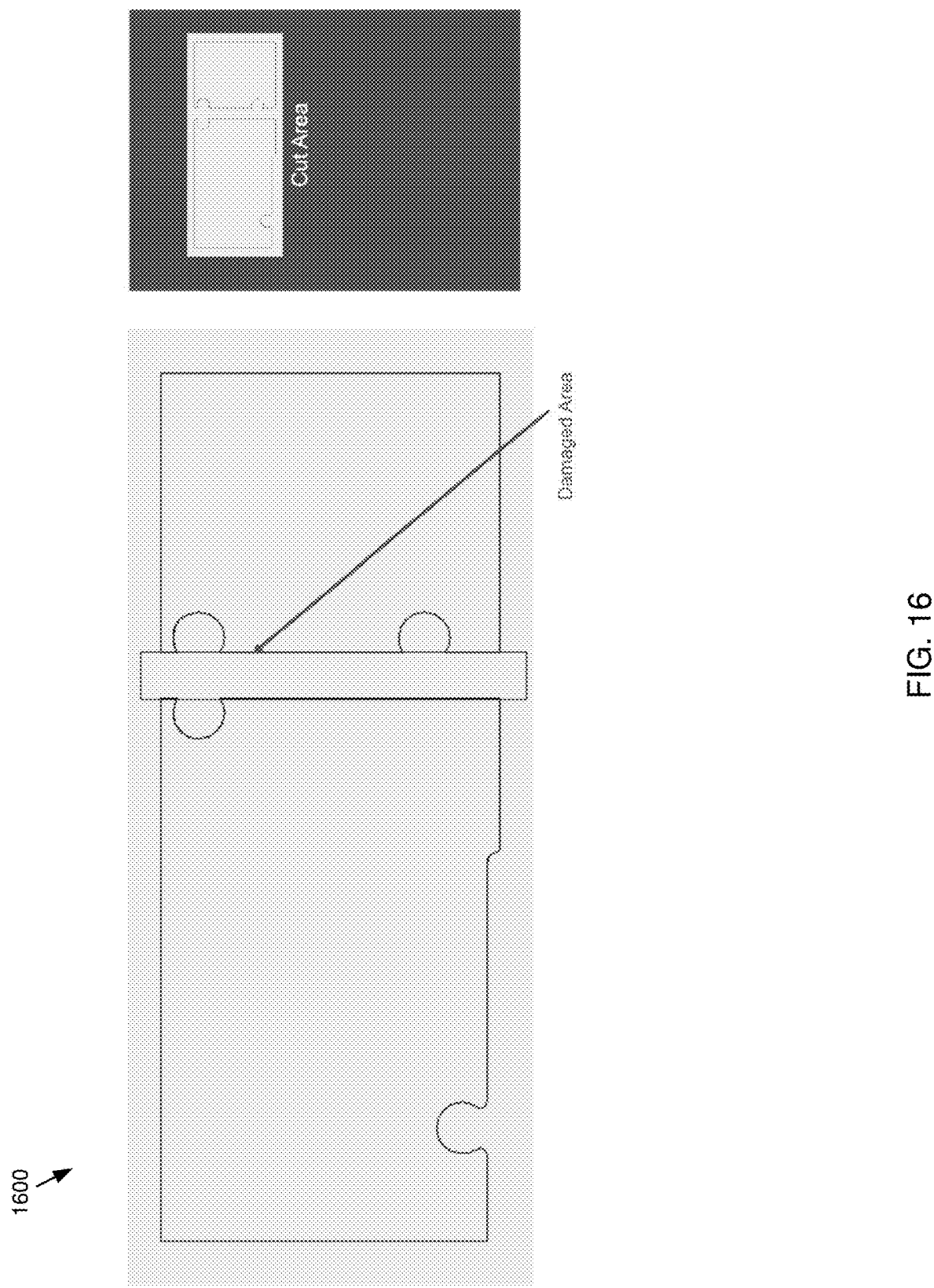

Referring now to FIGS. 14-20, embodiments of shape updating process 10 showing an example cut and stamp operation for splitting a shape is provided. FIGS. 14-15 shows example GUIs 1400 and 1500 depicting how to split a shape. GUI 1400 shows a starting shape and a cline segment, that may be added by a front-end designer is shown on GUI 1500. FIG. 16 shows a diagram 1600 depicting the damaged area and cut area. In this example, the polygon may be shaped with only voids in the area of interest. Any remaining voids may be cached aside to be reloaded later.

Figure 17:
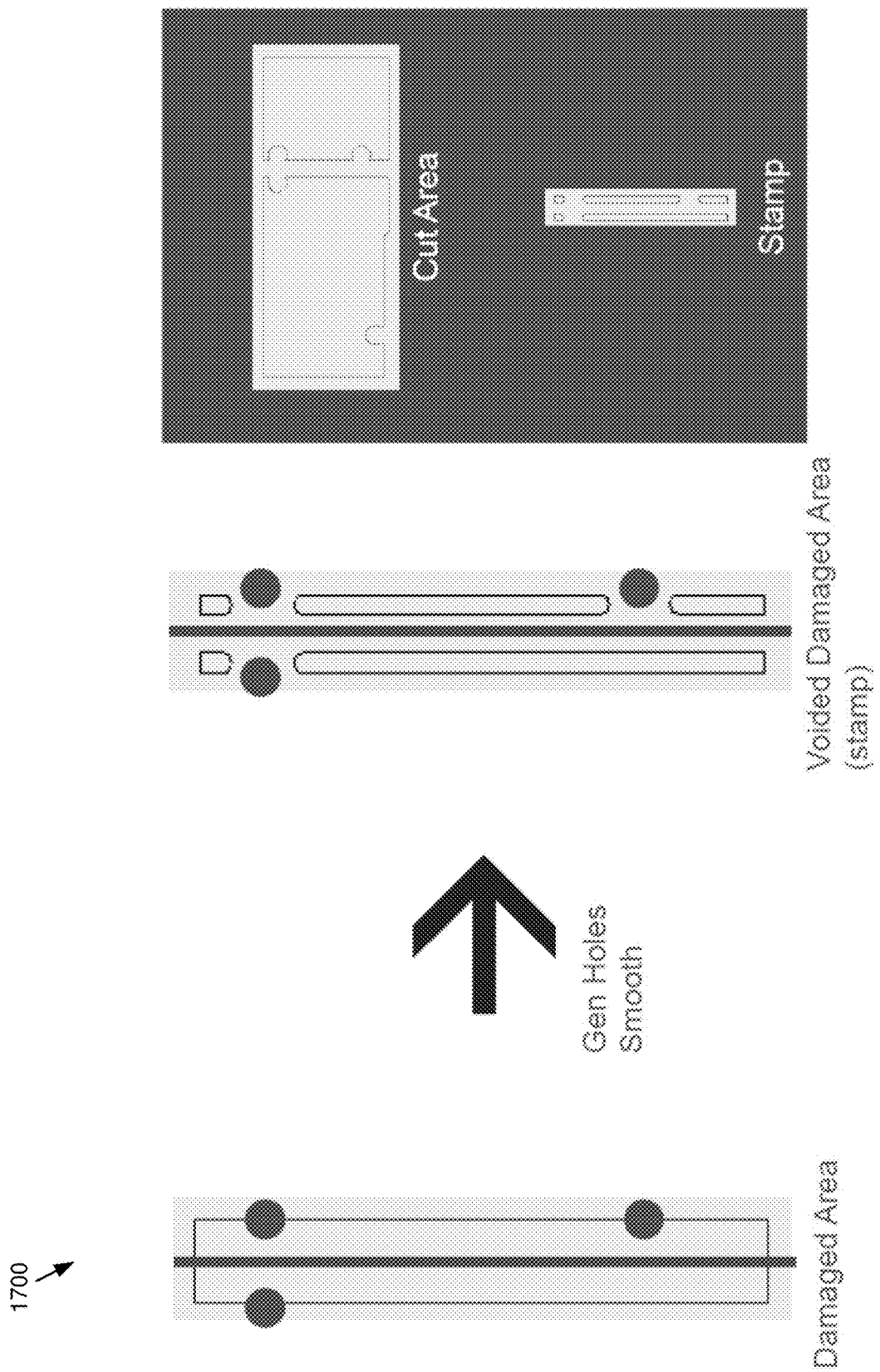
Figure 18:
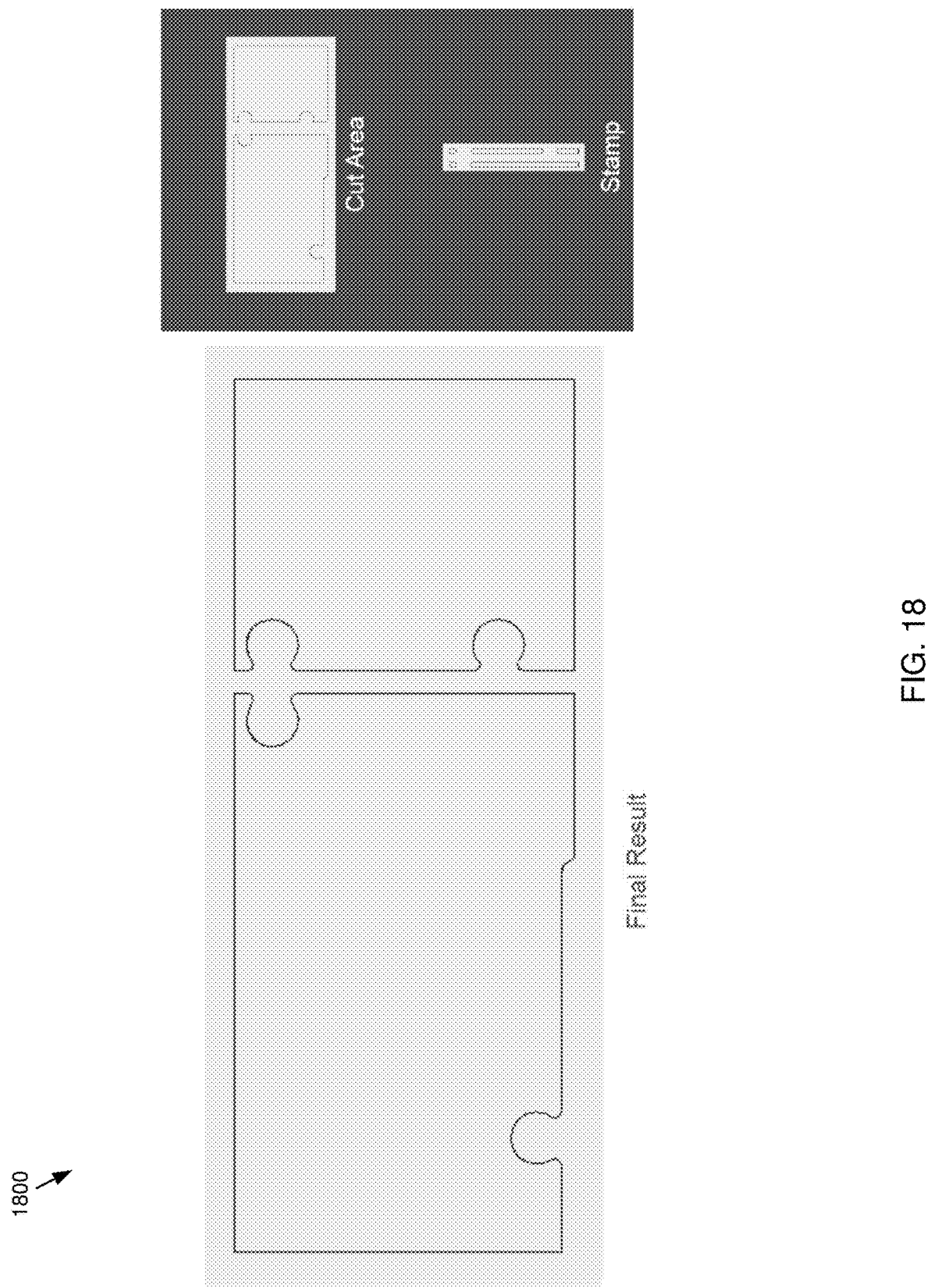
Figure 19:
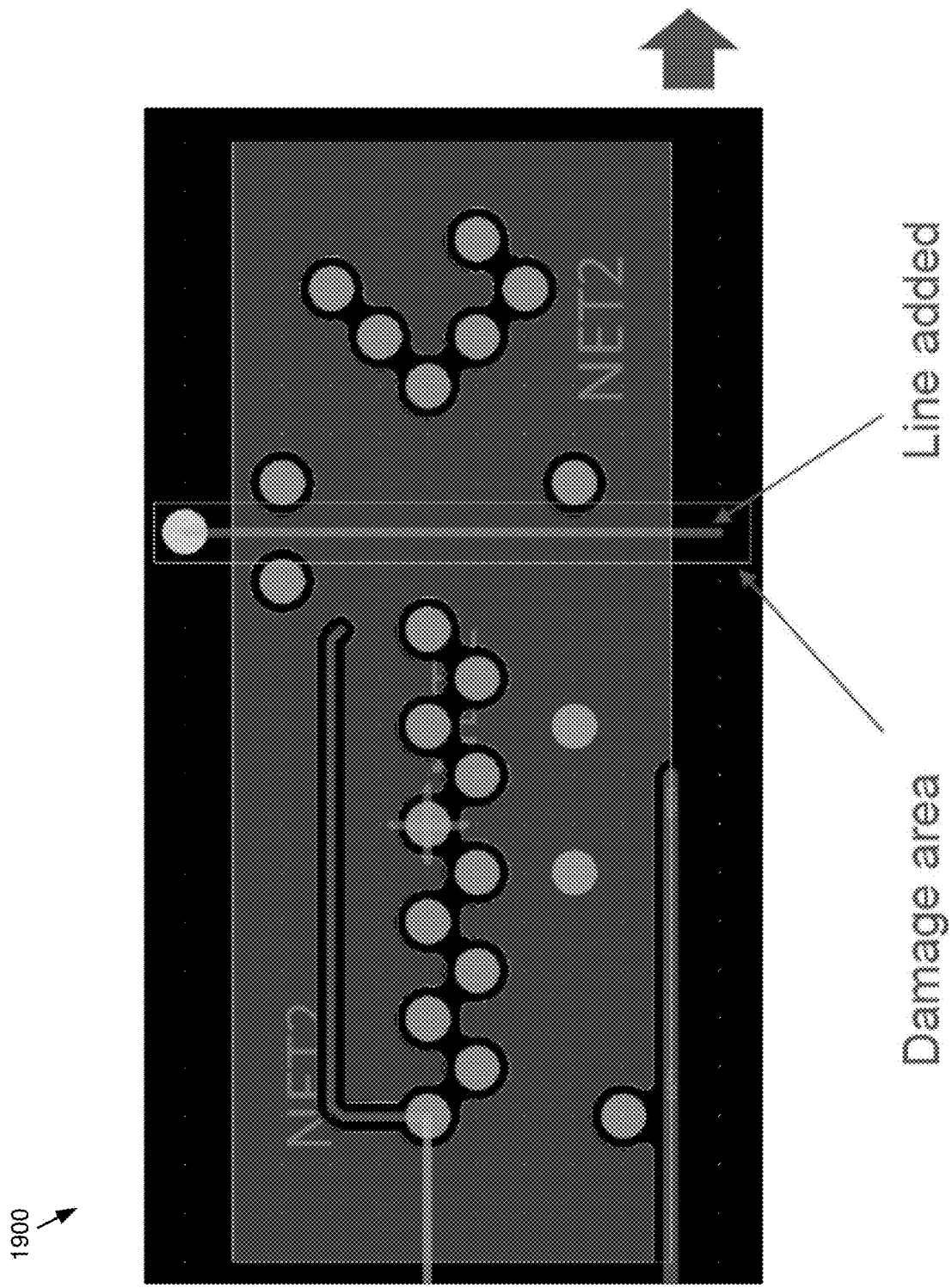
Figure 20:
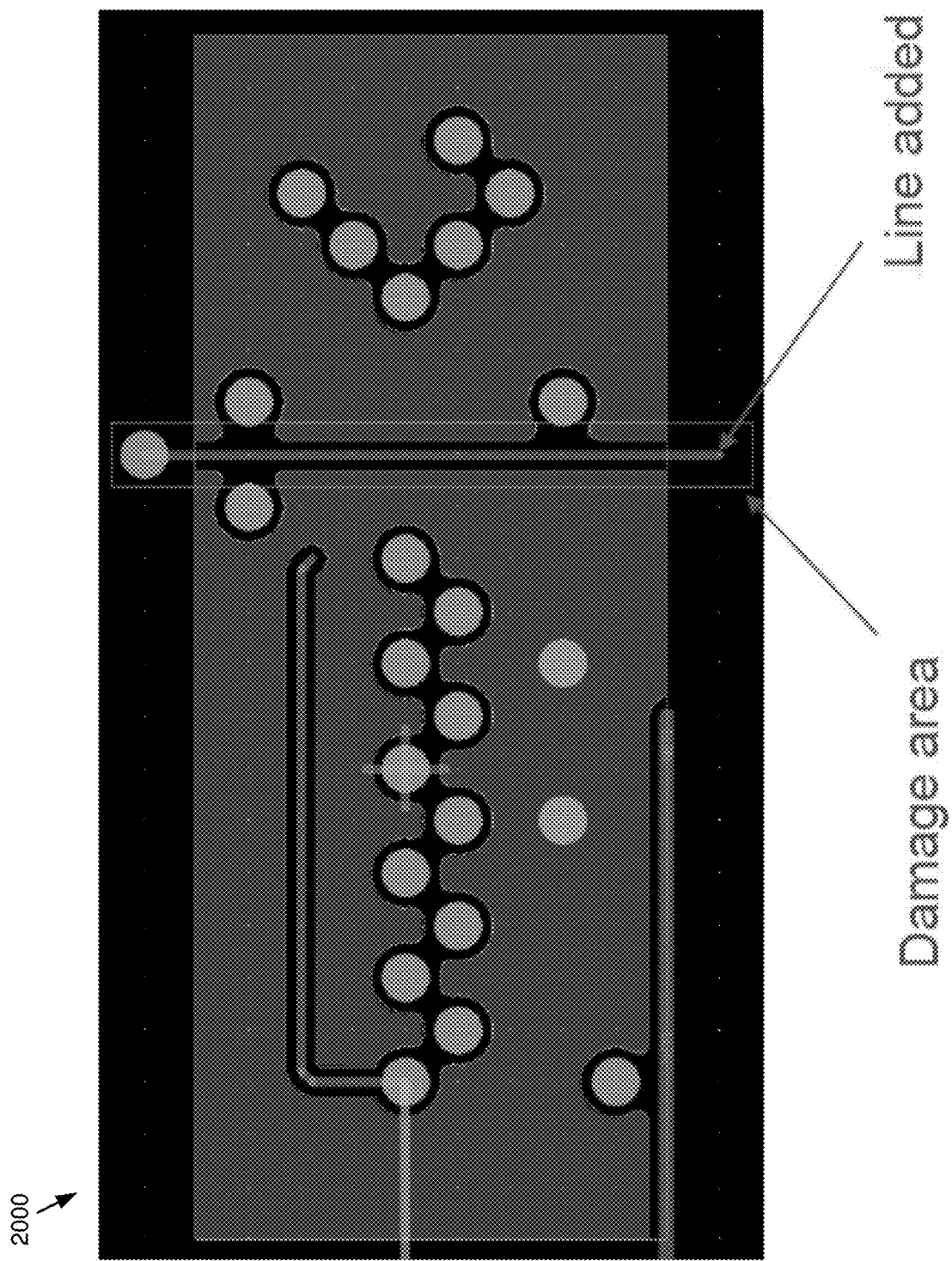

Referring now to FIG. 17, a diagram 1700 showing an example for processing the damaged area is provided. In this particular figure, the damaged area and voided damaged area resulting from the stamp operation are displayed. The final result is depicted in FIG. 18. FIGS. 19-20 show GUIs 1900 and 2000 depicting the damage area and line added both before the cut and stamp of shape updating process 10 (GUI 1900) and the final results (GUI 2000). It should be noted that the final result provided to the designer may not include the damage area and subsequent rectangle depicted in FIG. 20.

It should be noted that performance of shape updating process 10 may be linear based upon the damage area size and layers. The damage area increases with the number of objects that were changed. Shapes in the damage area on all layers may need to be updated.

Figure 21:
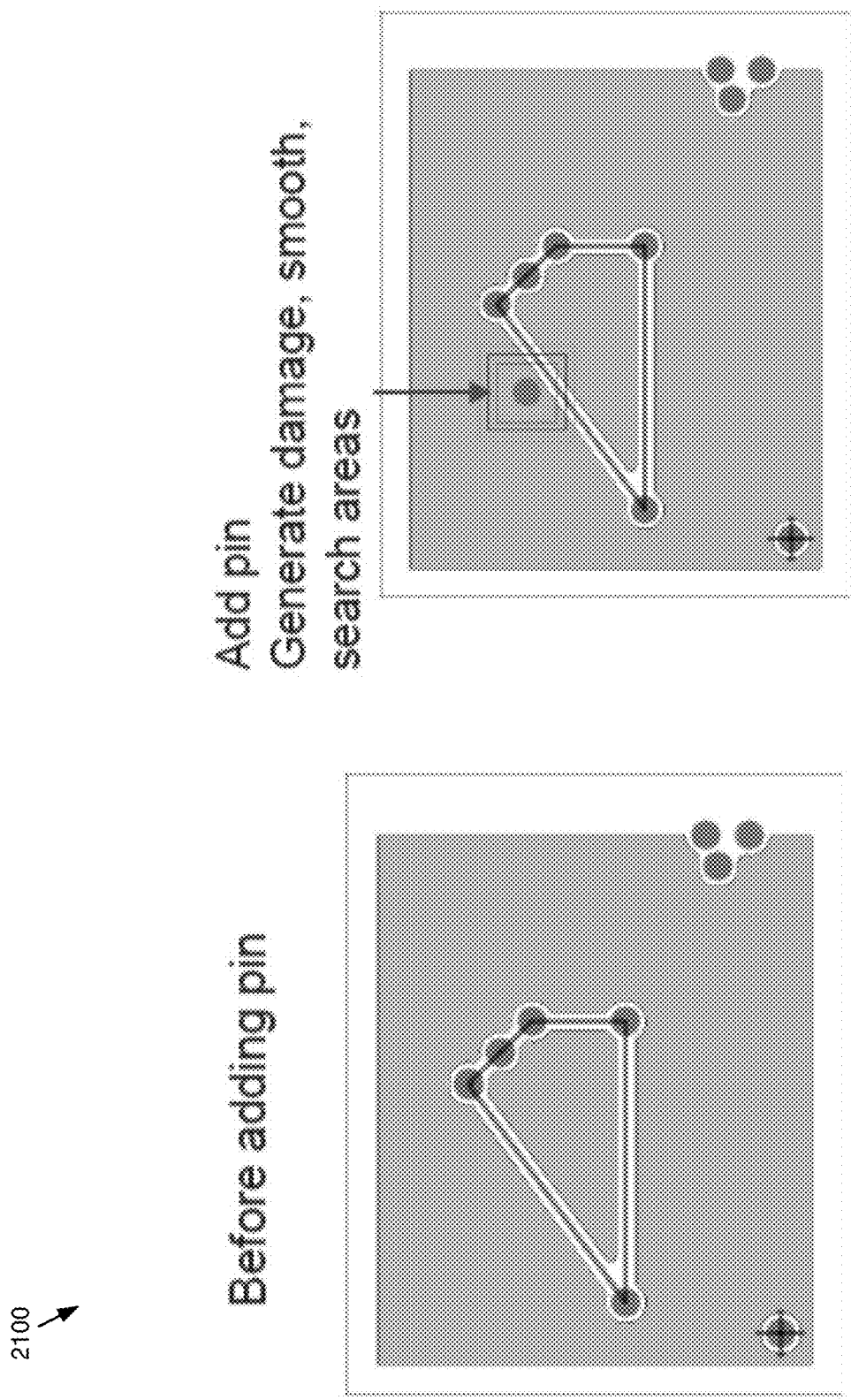
Figure 24:
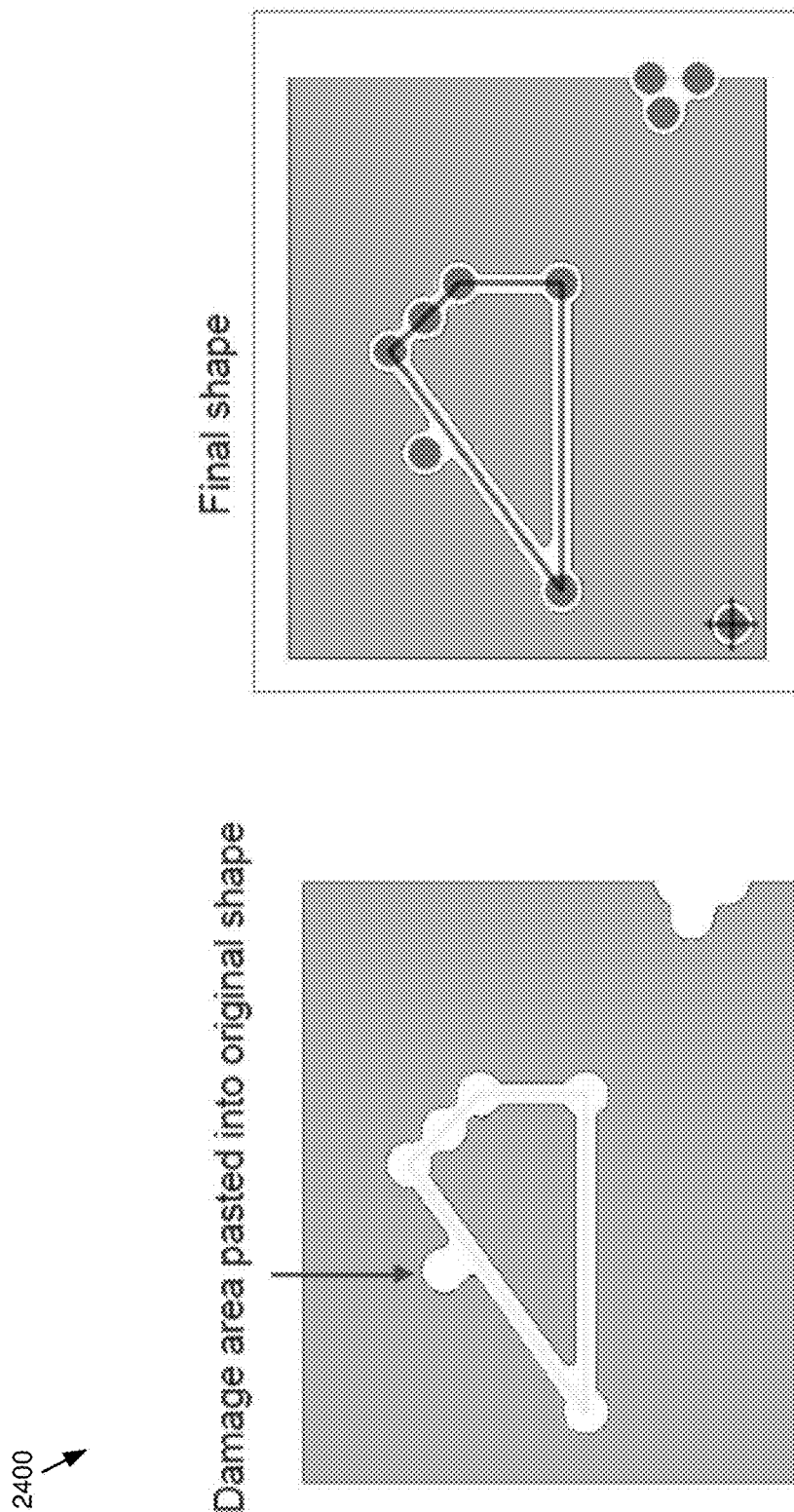

Referring now to FIGS. 21-24, examples consistent with embodiments of shape updating process 10 are provided. In this example, the process may add a pin that conflicts with an existing void. In some embodiments, shape updating process 10 may generate the damage area, smooth area and search area (can be any closed polygon). The process may then cut the damage area out of the original shape and locate all objects in or intersecting search area. In the example of FIGS. 21-22 shape updating process 10 located two objects requiring voids. As shown in FIG. 23, shape updating process 10 may generate voids in the smooth area for all objects found. This may include performing logical operations to resolve conflict by merging voids, performing smoothing operations on the smooth area, and/or trimming the smoothing area back to damage area. Shape updating process 10 may paste the damage area back into original shape as shown in FIG. 24. In this example, the user does not see the intermediate steps.

Figure 25:
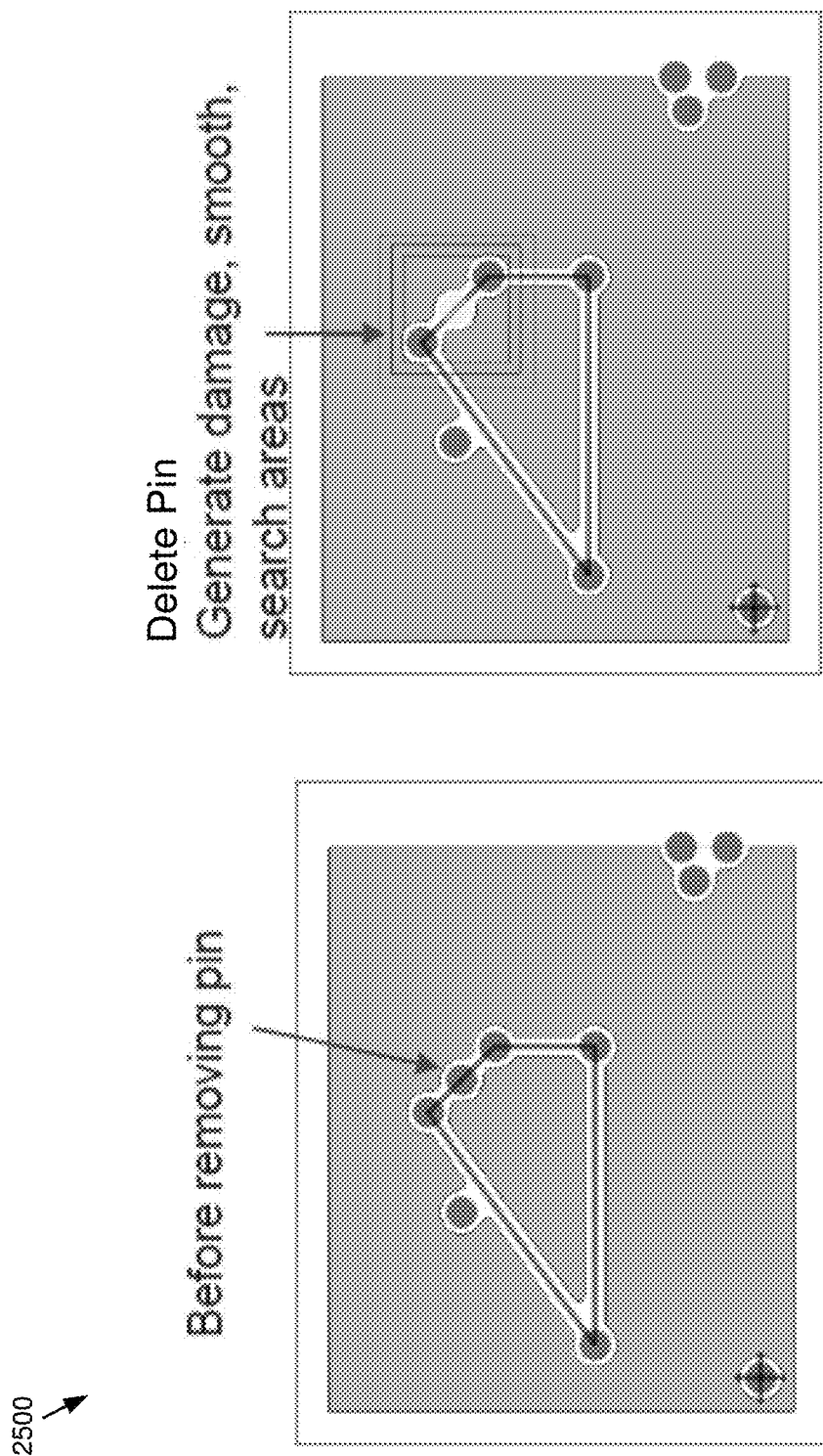
Figure 26:
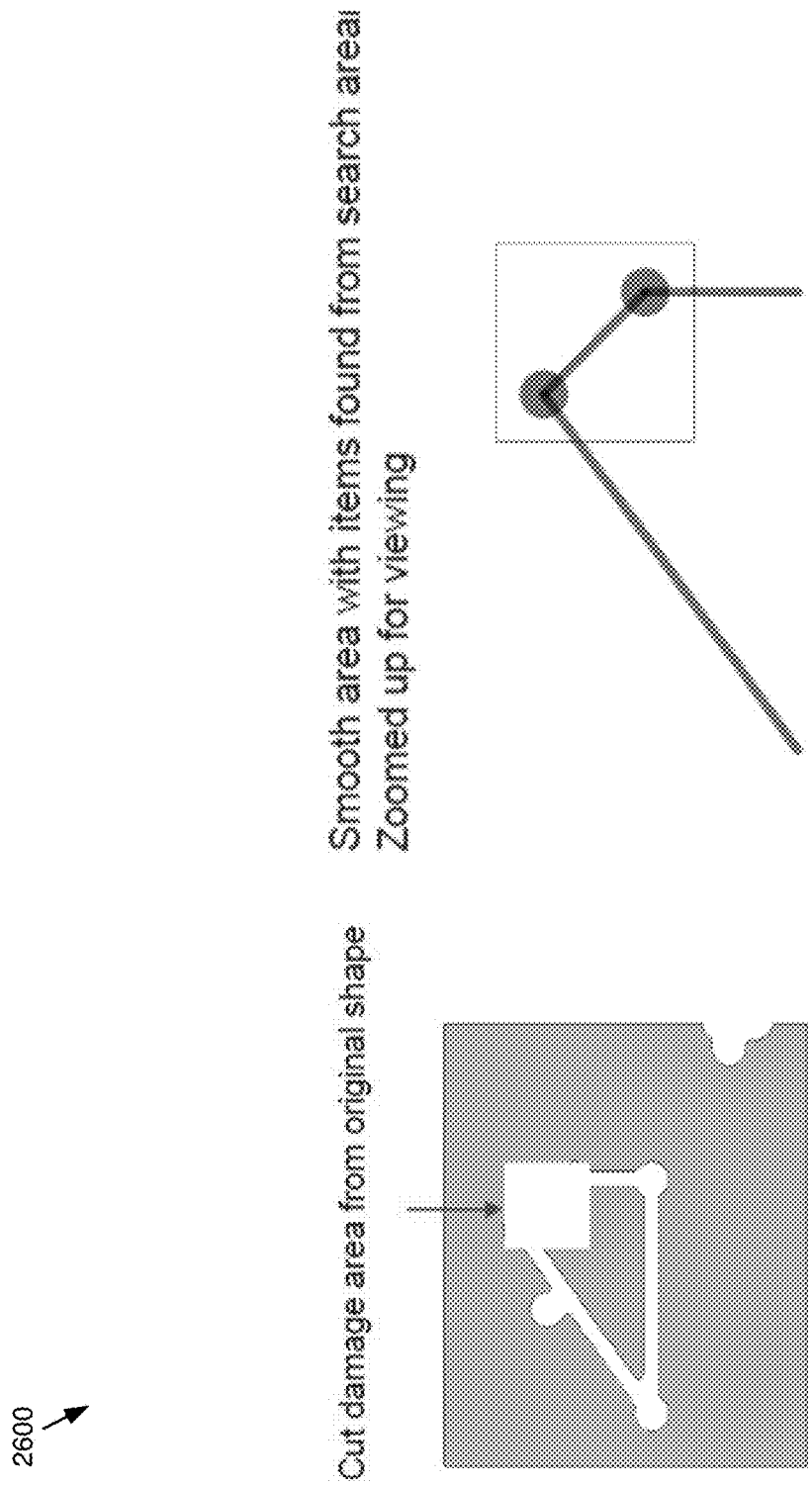
Figure 28:
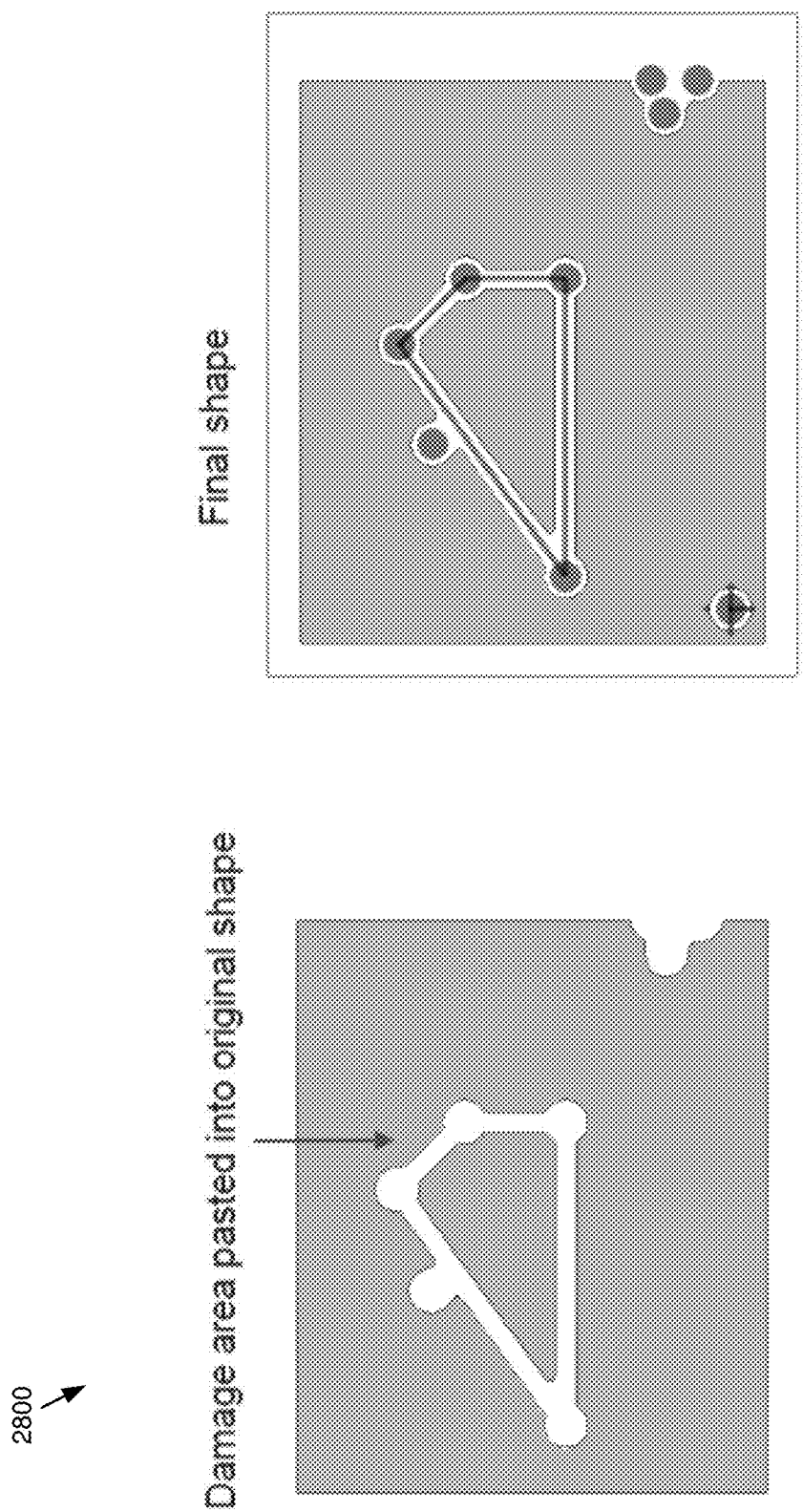

Referring now to FIGS. 25-28, an embodiment of shape updating process 10 showing an example of pin deletion is provided. As shown in FIG. 25, process 10 may generate the damage area, smooth area and search area (can be any closed polygon). Shape updating process 10 may then cut the damage area out of the original shape as shown in FIG. 26. The process may locate all objects in or intersecting search area. In this case shape updating process 10 identified two objects requiring voids. As shown in FIG. 27, shape updating process 10 generates voids in the smooth area for all objects found. This may include performing logical operations to resolve conflict by merging voids, performing smoothing operations on smooth area, and trimming the smooth area back to damage area. As shown in FIG. 28, shape updating process 10 may paste the damage area back into original shape. User does not see the intermediate steps.

In some embodiments, EDA application 20 may support a variety of languages and/or standards. Some of these may include, but are not limited to, IEEE-standard languages, the Open Verification Methodology (OVM), the emerging Accellera Universal Verification Methodology (UVM), and the e Reuse Methodology (eRM). EDA application 20 may support one or more software extensions, which may provide a high-throughput channel between the testbench and the device under test (DUT), and enable automated metric driven verification of embedded software exactly as if it were another part of the DUT.

In some embodiments, EDA application 20 may support e, Open Verification Library (OVL), OVM class library, emerging UVM class library, SystemC®, SystemC Verification Library, SystemVerilog, Verilog®, VHDL, PSL, SVA, CPF, as well as numerous other languages. EDA application 20 may be used in accordance with mixed-language, mixed-signal, and low-power designs, across multiple levels of abstraction, and may include the ability to "hot swap" the RTL simulation in/out of numerous accelerators/emulators.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for use in an electronic design environment comprising:
   receiving, using a processor, an electronic design;
   providing, at a graphical user interface, an option to change an object associated with the electronic design;
   identifying a damage area associated with the electronic design, the damage area including an object therein;
   generating a polygon for the damage area;
   caching one or more voids located outside of the damage area;
   performing a cut and stamp operation on a portion of the electronic design associated with the damage area; and
   populating, at the graphical user interface, a repaired damage area.

2. The computer-implemented method of claim 1, further comprising:
   identifying a smoothing area.

3. The computer-implemented method of claim 2, further comprising:
   generating a polygon for the smoothing area.

4. The computer-implemented method of claim 3, further comprising:
   performing smoothing on the object and any objects touching the smoothing area.

5. The computer-implemented method claim 2, wherein the damage area is based upon, at least in part, a design rule clearance from the object and a factor of minimum manufacturing aperture.

6. The computer-implemented method claim 5, wherein the smoothing area is based upon, at least in part, the damage area and the factor of minimum manufacturing aperture.

7. The computer-implemented method of claim 1, further comprising:
   increasing a size of the damage area if a plurality of objects are changed.

8. The computer-implemented method of claim 1, further comprising:
   identifying at least one object on each of a plurality of layers.

9. The computer-implemented method claim 8, further comprising:
   generating, caching, performing, and populating for a plurality of objects.

10. A non-transitory computer-readable storage medium having stored thereon instructions that when executed by a machine result in the following operations:
    receiving, using a processor, an electronic design;
    providing, at a graphical user interface, an option to change an object associated with the electronic design;
    identifying a damage area associated with the electronic design, the damage area including an object therein;
    generating a polygon for the damage area;
    caching one or more voids located outside of the damage area;
    performing a cut and stamp operation on a portion of the electronic design associated with the damage area; and
    populating, at the graphical user interface, a repaired damage area.

11. The non-transitory computer-readable storage medium of claim 10, further comprising:
    identifying a smoothing area.

12. The non-transitory computer-readable storage medium of claim 11, further comprising:
    generating a polygon for the smoothing area.

13. The non-transitory computer-readable storage medium of claim 12, further comprising:
    performing smoothing on the object and any objects touching the smoothing area.

14. The non-transitory computer-readable storage medium of claim 11, wherein the damage area is based upon, at least in part, a design rule clearance from the object and a factor of minimum manufacturing aperture.

15. The non-transitory computer-readable storage medium of claim 14, wherein the smoothing area is based upon, at least in part, the damage area and the factor of minimum manufacturing aperture.

16. The non-transitory computer-readable storage medium of claim 10, further comprising:
    increasing a size of the damage area if a plurality of objects are changed.

17. The non-transitory computer-readable storage medium of claim 10, further comprising:
    identifying at least one object on each of a plurality of layers.

18. The non-transitory computer-readable storage medium of claim 17, further comprising:
    generating, caching, performing, and populating for a plurality of objects.

19. A system for use in an electronic design environment comprising:
    a computing device having at least one processor configured to receive an electronic design and provide, at a graphical user interface, an option to change an object associated with the electronic design, the at least one processor further configured to identify a damage area associated with the electronic design, the damage area including an object therein, the at least one processor further configured to generate a polygon for the damage area and cache one or more voids located outside of the damage area, the at least one processor further configured to perform a cut and stamp operation on a portion of the electronic design associated with the damage area, the at least one processor further configured to populate, at the graphical user interface, a repaired damage area.

20. The system of claim 19, wherein the at least one processor is further configured to identify a smoothing area.

* * * * *